US010366250B1

(12) United States Patent
Chen et al.

(10) Patent No.: US 10,366,250 B1
(45) Date of Patent: Jul. 30, 2019

(54) SYSTEMS AND METHODS FOR PROTECTING PERSONALLY IDENTIFIABLE INFORMATION DURING ELECTRONIC DATA EXCHANGES

(71) Applicant: Symantec Corporation, Mountain View, CA (US)

(72) Inventors: Joseph Chen, Manhattan Beach, CA (US); Arvind Rao, Los Angeles, CA (US); Quentin Liu, San Jose, CA (US)

(73) Assignee: Symantec Corporation, Mountain View, CA (US)

( * ) Notice: Subject to any disclaimer, the term of this patent is extended or adjusted under 35 U.S.C. 154(b) by 244 days.

(21) Appl. No.: 15/437,601

(22) Filed: Feb. 21, 2017

(51) Int. Cl.
*H04L 9/32* (2006.01)
*G06F 21/62* (2013.01)
*H04L 29/06* (2006.01)

(52) U.S. Cl.
CPC ...... *G06F 21/6254* (2013.01); *G06F 21/6263* (2013.01); *H04L 9/3263* (2013.01); *H04L 63/0823* (2013.01); *H04L 63/102* (2013.01)

(58) Field of Classification Search
CPC . G06F 21/6254; G06F 21/626; H04L 9/3263; H04L 63/0823; H04L 63/102
USPC .......................................................... 726/4
See application file for complete search history.

(56) References Cited

U.S. PATENT DOCUMENTS

| 7,849,020 | B2* | 12/2010 | Johnson ................. G06Q 20/02 705/14.23 |
| 7,877,299 | B2 | 1/2011 | Bui |
| 8,381,969 | B1 | 2/2013 | Miller et al. |
| 9,246,944 | B1* | 1/2016 | Chen ....................... H04L 63/20 |
| 9,805,213 | B1* | 10/2017 | Kragh ................. G06F 21/6227 |
| 2001/0032878 | A1 | 10/2001 | Tsiounis et al. |
| 2006/0235761 | A1* | 10/2006 | Johnson ................. G06Q 20/02 705/26.1 |
| 2009/0287837 | A1* | 11/2009 | Felsher ................. G06F 19/328 709/229 |
| 2011/0270751 | A1 | 11/2011 | Csinger |
| 2012/0267432 | A1 | 10/2012 | Avinash |

(Continued)

FOREIGN PATENT DOCUMENTS

WO WO2002017178 2/2002

OTHER PUBLICATIONS

Sudheer et al.; Secure Ciphering based QR Pay System for Mobile Devices; http://www.rspublication.com/ijeted/jan13/66.pdf, accessed Mar. 1, 2017.

*Primary Examiner* — Michael Pyzocha
*Assistant Examiner* — Zoha Piyadehghibi Tafaghodi
(74) *Attorney, Agent, or Firm* — FisherBroyles, LLP

(57) ABSTRACT

The disclosed computer-implemented method for protecting personally identifiable information during electronic data exchanges may include (i) receiving, from a computing device, an authentication token for a proposed electronic data exchange, (ii) preventing the user's personally identifiable information from entering the proposed electronic data exchange by identifying the user using the anonymized identifier rather than using the user's personally identifiable information, (iii) authenticating the user identified in the data exchange information, and (iv) in response to authenticating the user, authorizing completion of the proposed electronic data exchange. Various other methods, systems, and computer-readable media are also disclosed.

28 Claims, 12 Drawing Sheets

(56) References Cited

U.S. PATENT DOCUMENTS

| | | |
|---|---|---|
| 2012/0290468 A1 | 11/2012 | Benco et al. |
| 2014/0067675 A1 | 3/2014 | Leyva et al. |
| 2015/0088756 A1 | 3/2015 | Makhotin et al. |
| 2015/0262154 A1 | 9/2015 | Wolfson |
| 2015/0379516 A1 | 12/2015 | Yingst et al. |
| 2016/0283745 A1* | 9/2016 | Lafever ............... G06F 21/6254 |
| 2016/0342993 A1 | 11/2016 | Morgan et al. |

* cited by examiner

SYSTEMS AND METHODS FOR PROTECTING PERSONALLY IDENTIFIABLE INFORMATION DURING ELECTRONIC DATA EXCHANGES

BACKGROUND

The Internet allows information to be passed back and forth between parties with the push of a button. This information can travel great distances at incredible speeds over a massive public network, such as the World Wide Web. But that capability has caused problems to arise regarding the security of such information, and in particular, the security of personally identifiable information (PII). For example, enterprising hackers can obtain PII as it passes over a public network. To help prevent this, many communications are encrypted.

Hackers may also attempt to obtain PII by spoofing a website to make it look like the website belongs to a legitimate entity. For example, a website can be made to mimic a legitimate e-commerce website. When an unsuspecting Internet user happens on the site, they may think that it is a legitimate website. When the user wants to purchase something using the site, they may be required to enter PII, such as a username, password, name, address, and/or credit card information, into the spoofed website, which is in turn sent to the hackers.

Some websites, such as those corresponding to financial institutions, have derived a way for users to verify that a website is legitimate. For example, when a user wants to access their account, they may be required to enter their account number and/or username on the website. The website may then display an image or phrase that the user has set up beforehand with the website. If the image or phrase matches the one that was set up earlier, the user knows that the website is legitimate. Otherwise, the user knows that they are on a spoofed website.

While this approach provides a certain level of security, it also has some shortcomings. For example, even though users can identify spoofed websites using this approach, they must send their account number and/or username to the website to do so. So while users will know that a spoofed website is not valid, hackers may already have some of their PII (e.g., the users' account number and/or username sent during the set-up phase). Another shortcoming is that when users first set up the image or phrase, they may not know if they are communicating with a legitimate website. They may be setting everything up on a spoofed website, allowing hackers to receive more PII.

Another shortcoming is that this approach is limited. For it to work, the user must set it up beforehand with the specific website. So this approach is generally only used with websites that a user accesses regularly, like a bank. It may be just too cumbersome for users to set everything up beforehand on other websites. For example, if a user wanted to make a purchase from an e-commerce website he has never visited before, the user would have to set up his security information with the website before he could make the purchase, and he would have no way of knowing if the website was legitimate.

In addition, conventional point-of-sale (POS) systems for processing payments and other digital transactions are often associated with various problems. For example, conventional POS systems may raise concerns about both information security and transaction efficiency. From a security standpoint, conventional POS systems also often transmit personally identifiable information as part of the transaction. For example, at a grocery store, a customer purchasing groceries may pay for the groceries with a credit card, which may reveal personally identifying information of the customer to the grocery store and may similarly expose the customer to a variety of threats, such as dishonest sales clerks, credit card skimming devices, and security breaches.

Similarly, conventional systems for processing payments and other digital transactions may introduce concerns about efficiency due to the length and complexity of the corresponding payment ecosystem. For example, a conventional credit card authentication process may trace a route from a buyer to a gateway, to a bank, to a network, back to the bank, back to the network, back to the bank, back to the gateway, and finally to a merchant. Unfortunately, this complexity may both slow down transaction processing time and increase the number of security vulnerabilities that attackers can exploit. The instant disclosure, therefore, identifies and addresses a need for improved systems and methods capable of securing electronic data exchanges.

SUMMARY

As will be described in greater detail below, the instant disclosure describes various systems and methods for protecting personally identifiable information during electronic data exchanges. In some embodiments, parties involved in an electronic data exchange can authenticate each other without sending personally identifiable information. In some embodiments, the electronic data exchange can occur without either party sending personally identifiable information.

In one example, a computer-implemented method for performing such a task may include (i) receiving, from a computing device, an authentication token for a proposed electronic data exchange, the authentication token including (a) an anonymized identifier, for a user of the computing device, that obviates a need to transmit personally identifiable information of the user as part of the proposed electronic data exchange and (b) information of the proposed electronic data exchange extracted by the computing device from a digital representation of the proposed electronic data exchange, (ii) preventing the user's personally identifiable information from entering the proposed electronic data exchange by identifying the user using the anonymized identifier rather than using the user's personally identifiable information, (iii) authenticating the user identified in the data exchange information, and (iv) in response to authenticating the user, authorizing completion of the proposed electronic data exchange.

In one embodiment, an entity that generated the digital representation of the proposed electronic data exchange does not receive any of the user's personally identifiable information as part of the proposed electronic data exchange. In some examples, the digital representation of the proposed electronic data exchange may be encoded within a barcode and/or a wireless data stream. In addition, the information of the proposed electronic data exchange extracted by the computing device from the digital representation may include (i) an identifier of an entity that generated the digital representation of the proposed electronic data exchange, (ii) an identifier of a product associated with the proposed electronic data exchange, and/or (iii) an identifier of the proposed electronic data exchange.

In some embodiments, the computer-implemented method may further include, prior to authorizing completion of the proposed electronic data exchange, using the identifier of the entity that generated the digital representation of the proposed electronic data exchange to authenticate the entity.

In one embodiment, the computer-implemented method may further include (i) receiving a cryptographic protocol certificate for an entity that is proposing the electronic data exchange and (ii) authenticating the cryptographic protocol certificate.

The computing device may extract the digital representation of the proposed electronic data exchange in a variety of ways, for example, from a website of an entity that generated the digital representation of the proposed electronic data exchange and/or a physical location of the entity. In one embodiment, an entity may generate the digital representation of the proposed electronic data exchange in response to receiving an indication, from the user, to complete the proposed electronic data exchange. In some embodiments, the computing device may authenticate the user's identity prior to transmitting the authentication token.

In some examples, authorizing completion of the proposed electronic data exchange may include authorizing an account service to complete the proposed electronic data exchange by (i) transmitting account information for the user to the account service and/or (ii) transmitting, to the account service, account information for an entity that generated the digital representation of the proposed electronic data exchange. In one embodiment, the account service may use the account information to complete the proposed electronic data exchange by transferring an amount from an account of the user to an account of the entity that generated the proposed electronic data exchange and/or transferring an amount from the account of the entity to the account of the user.

In one example, the computer-implemented method may further include transmitting, in response to completion of the proposed electronic data exchange, a confirmation notification that confirms completion of the proposed electronic data exchange to the user of the computing device and/or an entity that generated the digital representation of the proposed electronic data exchange.

In one embodiment, the computing device may represent a smartphone. In this embodiment, the digital representation of the proposed electronic data exchange may be encoded within a matrix barcode, and the smartphone may extract the digital representation of the proposed electronic data exchange in part by scanning the matrix barcode from a website or a POS machine using a digital camera of the smartphone.

In some embodiments, a system for implementing the above-described method may include (i) a receiving module, stored in memory, that receives, from a computing device, an authentication token for a proposed electronic data exchange, the authentication token including (a) an anonymized identifier, for a user of the computing device, that obviates a need to transmit personally identifiable information of the user as part of the proposed electronic data exchange and (b) information of the proposed electronic data exchange extracted by the computing device from a digital representation of the proposed electronic data exchange, (ii) a prevention module, stored in memory, that prevents the user's personally identifiable information from entering the proposed electronic data exchange by identifying the user using the anonymized identifier rather than using the user's personally identifiable information, (iii) an authentication module, stored in memory, that authenticates the user identified in the data exchange information, (iv) an authorization module, stored in memory, that, in response to authenticating the user, authorizes completion of the proposed electronic data exchange, and (v) at least one physical processor configured to execute the reception module, the prevention module, the authentication module, and the authorization module.

In some examples, the above-described method may be encoded as computer-readable instructions on a non-transitory computer-readable medium. For example, a computer-readable medium may include one or more computer-executable instructions that, when executed by at least one processor of a backend computing device, may cause the backend computing device to (i) receive, from a computing device, an authentication token for a proposed electronic data exchange, the authentication token including (a) an anonymized identifier, for a user of the computing device, that obviates a need to transmit personally identifiable information of the user as part of the proposed electronic data exchange and (b) information of the proposed electronic data exchange extracted by the computing device from a digital representation of the proposed electronic data exchange, (ii) prevent the user's personally identifiable information from entering the proposed electronic data exchange by identifying the user using the anonymized identifier rather than using the user's personally identifiable information, (iii) authenticate the user identified in the data exchange information, and (iv) in response to authenticating the user, authorize completion of the proposed electronic data exchange.

In one example, an additional computer-implemented method may include (i) obtaining, by a first computing device from a second computing device, a digital representation of a proposed electronic data exchange, (ii) extracting, by the first computing device, information from the digital representation, the information including a characteristic of the proposed electronic data exchange and an identifier of an entity associated with the characteristic and (iii) electronically transmitting, by the first computing device to a third computing device, the authentication token, for authorization of the proposed electronic data exchange between the user and the entity. In this example, personally identifiable information of the user may be prevented from being transmitted by the first computing device. In additional, the authentication token may include both an anonymized identifier, for a user of the first computing device, and the information of the proposed electronic data exchange extracted from the digital representation.

In another example, a computer-implemented method may include (i) receiving, from a computing device, an authentication token for a proposed electronic data exchange, the authentication token including (a) an anonymized identifier, for a user of the computing device, that obviates the need to transmit personally identifiable information of the user as part of the proposed electronic data exchange and (b) information of the proposed electronic data exchange extracted by the computing device from a digital representation of the proposed electronic data exchange, (ii) preventing the user's personally identifiable information from entering the proposed electronic data exchange by identifying the user using the anonymized identifier rather than using the user's personally identifiable information, (iii) authenticating the user identified in the data exchange information, and (iv) in response to authenticating the user, authorizing completion of the proposed electronic data exchange.

In one example, an additional system for protecting personally identifiable information during electronic data exchanges may include a first computing device configured to (i) receive, from a second computing device, a digital representation of a proposed electronic data exchange, (ii)

extract information from the digital representation, the information including both (a) a characteristic of the proposed electronic data exchange and (b) an identifier of an entity associated with the characteristic, (iii) generate an authentication token that includes both (a) an anonymized identifier, for a user of the first computing device, and (b) the information of the proposed electronic data exchange extracted from the digital representation, and (iv) electronically transmit, to a third computing device, the authentication token, for authorization of the proposed electronic data exchange between the user and the entity. In addition, the second computing device may be configured to (i) generate the digital representation of the proposed electronic data exchange and (ii) output the digital representation of the proposed electronic data exchange for reception by the first computing device. Furthermore, the third computing device may be configured to (i) receive, from the first computing device, the authentication token, for authorization of the proposed electronic data exchange between the user and the entity and (ii) authorize completion of the proposed electronic data exchange. In this example, the system may be configured such that personally identifiable information of the user is prevented from being transmitted by the first computing device as part of the electronic data exchange.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
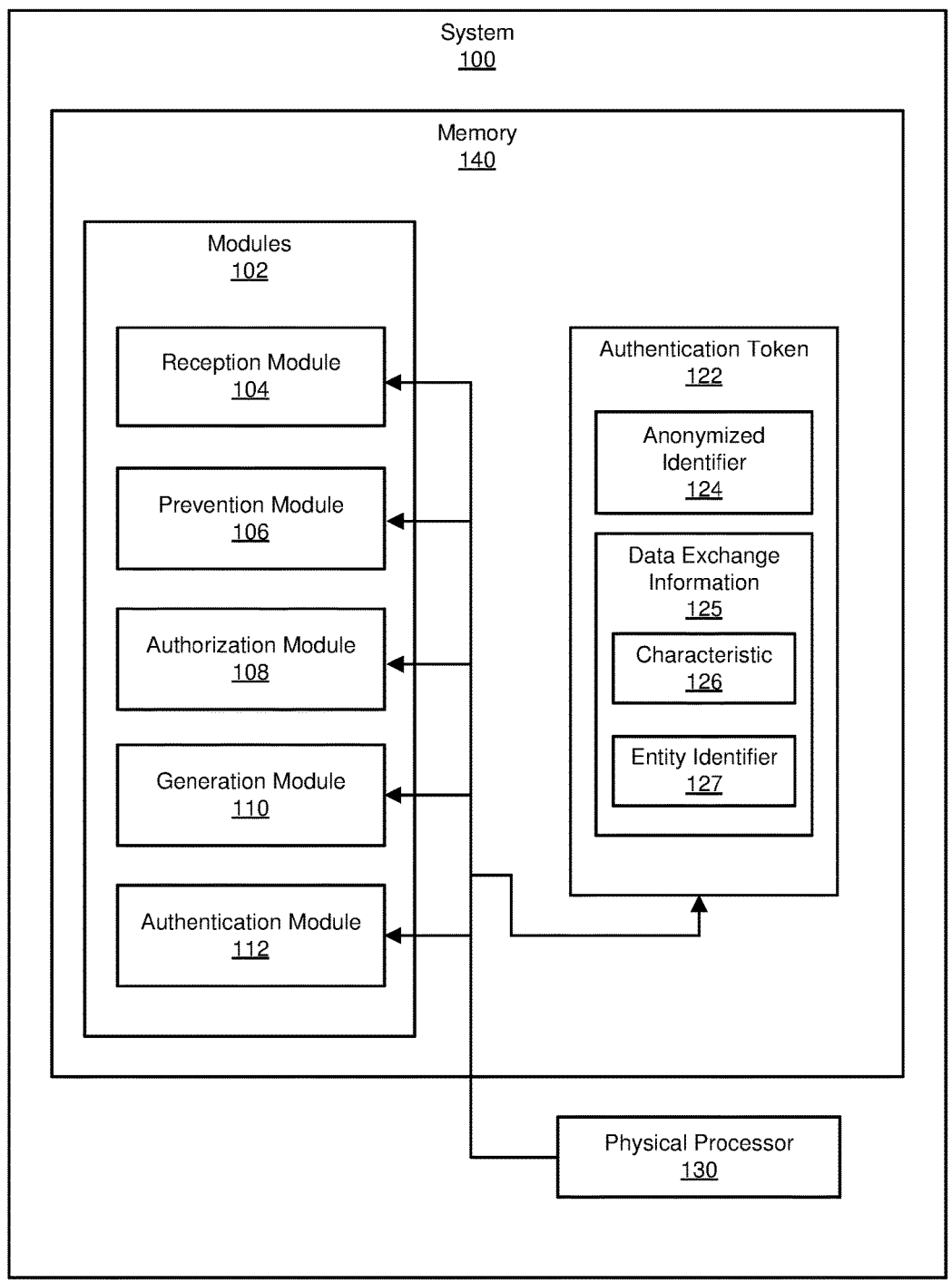
FIG. 1 is a block diagram of an example system for protecting personally identifiable information during electronic data exchanges.

Throughout the drawings, identical reference characters and descriptions indicate similar, but not necessarily identical, elements. While the example embodiments described herein are susceptible to various modifications and alternative forms, specific embodiments have been shown byway of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for protecting personally identifiable information during electronic data exchanges. As will be explained in greater detail below, the disclosed systems and methods may improve upon conventional systems by effectively preventing personally identifiable information from being included in a digital data exchange or payment transaction. The personally identifiable information may correspond to either party in a transaction, thereby providing one-way or two-way anonymity for the parties of the transaction. The disclosed systems and methods may also improve the security of the Internet or other network data exchanges by allowing one or both parties of a transaction to authenticate the other party without transmitting personally identifiable information.

More specifically, the disclosed systems and methods may enable a user to authenticate a website without the user or the website transmitting personally identifiable information. Accordingly, the disclosed systems and methods may also prevent eavesdropping and interception of personally identifiable information. A malicious attacker, or other security threat, may thereby be prevented from obtaining sensitive information of the user. Accordingly, the user may successfully authenticate a website and obtain an assurance that the website does not pose a security threat.

In one example, the disclosed systems and methods may establish a centralized intermediary as a single source of truth for electronic data exchanges, such as payment transactions (e.g., Internet transactions, point-of-sale transactions, etc.), confidential information transactions (e.g., medical record exchanges, etc.), digital communications (e.g., email or text messaging), peer-to-peer exchanges, and/or system access authorizations (e.g., registration processes, authentication or login services, etc.). For example, prior to conducting business, a buyer and/or a seller may register with a centralized intermediary to enable anonymized payment transactions. After the registration process, buyers may authenticate sellers and/or purchase goods and/or services through the centralized intermediary without transmitting any personally identifiable information.

For example, a buyer may authenticate a seller's web site (e.g., to make sure it is not spoofed) and/or make a purchase on the web site without inputting any personally identifiable information into the website. The buyer may also make a purchase without inputting any personally identifiable information into either the buyer's device (e.g., a smartphone or other device) or the seller's point-of-sale device. These capabilities can prevent interception of personally identifiable information by eavesdroppers. Similarly, the seller may conduct the transaction without receiving personally identifiable information of the buyer, thereby further protecting that information and enabling anonymized payment transactions.

Additionally, the disclosed systems and methods may generally simplify the payment process. Instead of a long payment ecosystem, as described above, the disclosed systems and methods may involve an initial registration process followed by, for each transaction, a party or counterparty transmitting an authentication token to the centralized intermediary. Upon receiving the authentication token, the centralized intermediary may then authenticate the transaction, party, and/or counterparty. Finally, in response to this authentication process, the centralized intermediary may authorize the corresponding transaction at an account service (such as a bank), as discussed further below.

More specifically, the disclosed systems and methods may improve on a conventional computing device by configuring, or encoding, the computing device to perform digital transactions in a manner that is more streamlined, anonymous, and/or secure from associated security threats, as discussed above. Additionally, or alternatively, the disclosed systems and methods may further improve upon related fields of technology, such as network security, barcode and barcode scanner technology, Quick Response (QR) codes, computerized or automated bank account management, financial record management, and/or medical record management, as further discussed below.

Figure 2:
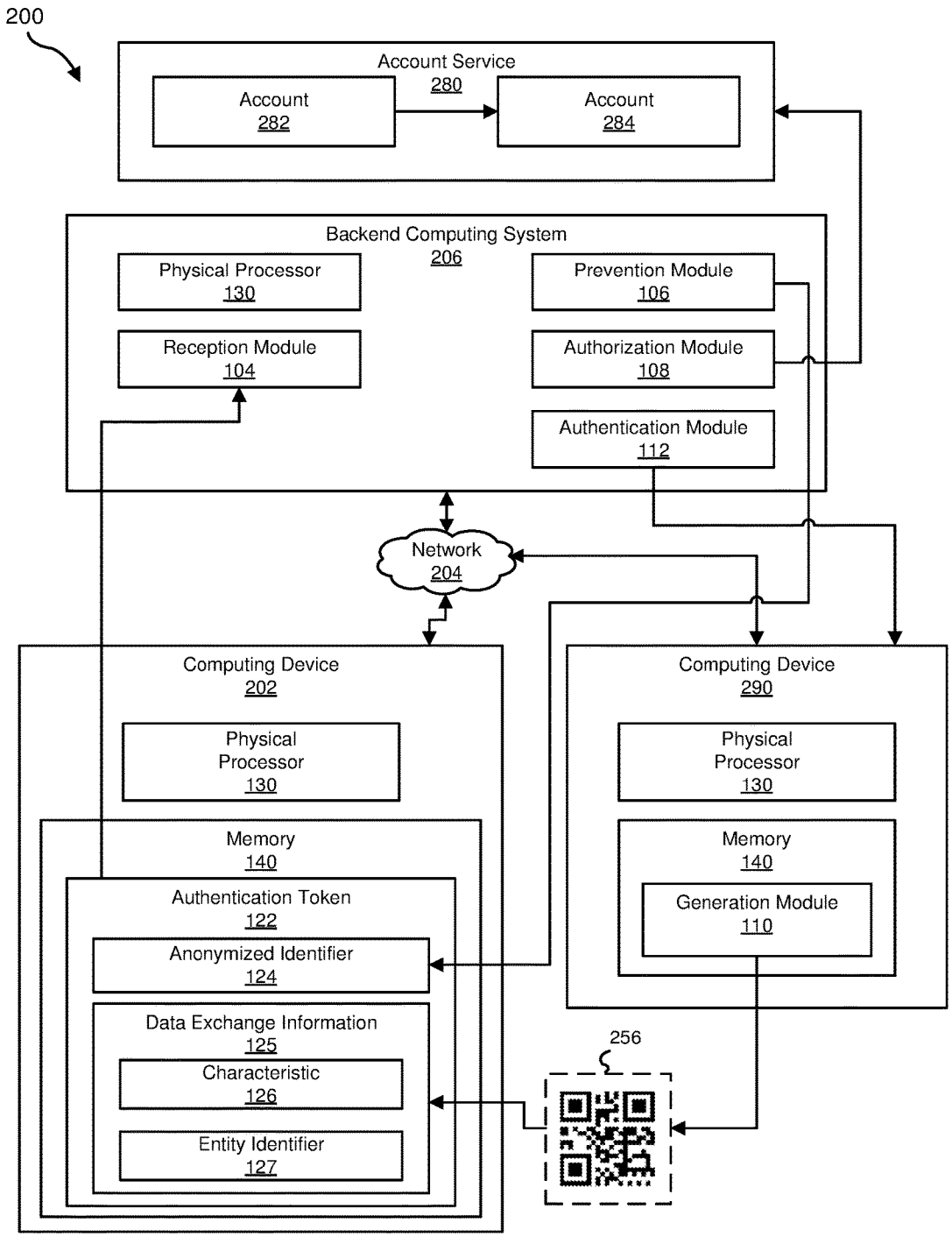
FIG. 2 is a block diagram of an additional example system for protecting personally identifiable information during electronic data exchanges.

The following will provide, with reference to FIGS. 1-2, detailed descriptions of example systems for protecting personally identifiable information during electronic data exchanges. Detailed descriptions of corresponding computer-implemented methods will also be provided in connection with FIGS. 3-10. In addition, detailed descriptions of an example computing system and network architecture capable of implementing one or more of the embodiments described herein will be provided in connection with FIGS. 11 and 12, respectively.

FIG. 1 is a block diagram of an example system 100 for protecting personally identifiable information during electronic data exchanges. As illustrated in this figure, example system 100 may include one or more modules 102 for performing one or more tasks. For example, and as will be explained in greater detail below, example system 100 may include a reception module 104 that receives, from a computing device, an authentication token for a proposed electronic data exchange. The authentication token may include (i) an anonymized identifier, for a user of the computing device, that obviates the need to transmit personally identifiable information of the user as part of the proposed electronic data exchange, and/or (ii) data exchange information, extracted by the computing device from a digital representation of the proposed electronic data exchange. As discussed below, the data exchange information may include (a) a characteristic of the proposed electronic data exchange, and (b) an identifier of the entity associated with the characteristic.

Example system 100 may additionally include a prevention module 106 that prevents the user's personally identifiable information from entering the proposed electronic data exchange by identifying the user using the anonymized identifier rather than using the user's personally identifiable information. Example system 100 may further include an authentication module 112 that authenticates the user identified by the anonymized identifier and/or the entity identified in the data exchange information. Example system 100 may further include an authorization module 108 that, in response to authenticating the user and/or the entity, authorizes completion of the proposed electronic data exchange. Additionally, system 100 may also include a generation module 110, as well as an authentication token 122, which may further include an anonymized identifier 124, and data exchange information 125, which may include a characteristic 126 and an identifier 127, as discussed above and discussed in more detail below in connection with FIGS. 2-10. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202, computing device 290, account service 280, and/or backend computing system 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally, or alternatively, physical processor 130 may execute one or more of modules 102 to facilitate protecting personally identifiable information during electronic data exchanges. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Example system 100 in FIG. 1 may be implemented in a variety of ways. For example, all or a portion of example system 100 may represent portions of example system 200 in FIG. 2. As shown in FIG. 2, system 200 may include a backend computing system 206 in communication with a computing device 202, a computing device 290, and/or an account service 280 via a network 204. In one example, all or a portion of the functionality of modules 102 may be performed by computing device 202, computing device 290, account service 280, backend computing system 206, and/or any other suitable computing system. For example, and as will be described in greater detail below, one or more of modules 102 may cause computing device 202, computing device 290, and/or backend computing system 206 to protect personally identifiable information during electronic data exchanges.

For example, as will be described in greater detail below, reception module 104 may receive, from computing device 202, an authentication token 122 for a proposed electronic data exchange (such as a transaction proposed by a user or owner of computing device 290, or displayed on a webpage shown by computing device 290).

Authentication token 122 may include both (i) anonymized identifier 124, for a user of computing device 202, that obviates the need to transmit the user's personally identifiable information as part of the proposed electronic data exchange, and (ii) information 125 of the proposed electronic data exchange extracted by computing device 202 from a digital representation 256 of the proposed electronic data exchange. Data exchange information 125 may include (a) a characteristic 126 of the proposed electronic data exchange, and (b) an identifier 127 of the entity associated with the characteristic.

In one example, prevention module 106 may prevent the user's personally identifiable information from entering the proposed electronic data exchange by identifying the user using anonymized identifier 124 rather than using the user's personally identifiable information. Authentication module 112 may authenticate the user and/or the entity and authorization module 108 may, in response to authentication module 112 authenticating the user and/or the entity, authorize completion of the proposed electronic data exchange between the user and the entity.

Computing device 202 and computing device 290 generally represent any type or form of computing device capable of reading computer-executable instructions. Additionally, computing device 202 and computing device 290 generally correspond to any device that a party (such as a buyer or a seller) may use to display a digital representation of a proposed electronic data exchange, extract data exchange information from such a digital representation, and/or generate a corresponding authentication token, as discussed below. In a specific embodiment, computing device 202 may correspond to a customer's smartphone. In one embodiment, computing device 290 may correspond to a computer having a browser capable of displaying the digital representation 256 of the proposed electronic data exchange. In another embodiment, computing device 290 may correspond to a vendor's point-of-sale device (or peripheral device attached to, or associated with, the point-of-sale device). Additional examples of computing device 202 and computing device 290 include, without limitation, laptops, tablets, desktops, servers, cellular phones, Personal Digital Assistants (PDAs), multimedia players, embedded systems, wearable devices (e.g., smart watches, smart glasses, etc.), gaming consoles, variations or combinations of one or more of the same, and/or any other suitable computing device.

As further shown in FIG. 2, computing device 290 may include generation module 110, which may generate digital representation 256, from which computing device 202 may extract entity identifier 127 (e.g., a seller ID or a buyer ID), and characteristic 126 (e.g., a transaction ID, and/or a price level, as discussed further below in connection with step 302 of method 300).

Backend computing system 206 generally represents any type or form of computing device that is configured for performing method 300, as discussed further below. More generally, backend computing system 206 may correspond to any backend computing device that may function as a centralized intermediary between parties to an electronic data exchange (such as between a buyer and a seller) in accordance with method 300. In specific examples, backend computing system 206 may correspond to a backend server maintained by a centralized security vendor, such as SYMANTEC CORPORATION. Additional examples of backend computing system 206 include, without limitation, security servers, application servers, web servers, storage servers, and/or database servers configured to run certain software applications and/or provide various security, web, storage, and/or database services. Although illustrated as a single entity in FIG. 2, backend computing system 206 may include and/or represent a plurality of servers that work and/or operate in conjunction with one another.

Network 204 generally represents any medium or architecture capable of facilitating communication or data transfer. In one example, network 204 may facilitate communication between computing device 202, computing device 290, account service 280, and backend computing system 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Account service 280 generally represents any service that may manage user, credit, and/or monetary accounts, including financial accounts. In one example, and as will be explained in greater detail below in connection with method 300 in FIG. 3, account service 280 may complete payment from an account 282 (e.g., an account for the customer operating a smartphone that corresponds to computing device 202) to an account 284 (e.g., an account for the vendor responsible for displaying the digital representation 256 of the proposed electronic data exchange).

Figure 3:
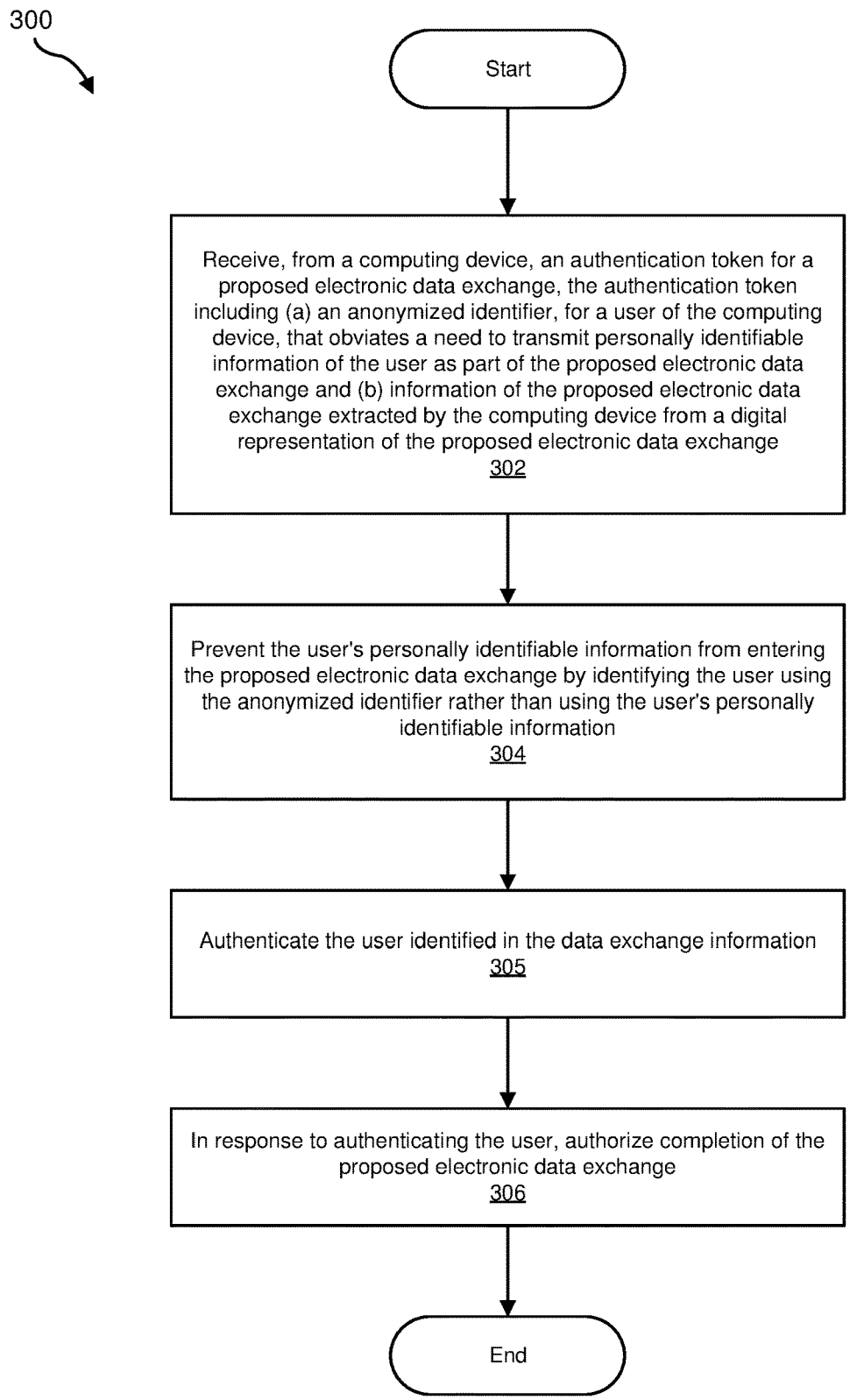
FIG. 3 is a flow diagram of an example method for protecting personally identifiable information during electronic data exchanges.

FIG. 3 is a flow diagram of an example computer-implemented method 300 for protecting personally identifiable information during electronic data exchanges. The steps shown in FIG. 3 may be performed by any suitable computer-executable code and/or computing system, including system 100 in FIG. 1, system 200 in FIG. 2, and/or variations or combinations of one or more of the same. In one example, method 300 may be performed by backend computing system 206. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may receive, from a computing device, an authentication token for a proposed electronic data exchange. The authentication token may include both (i) an anonymized identifier, for a user of the computing device, that obviates the need to transmit the user's personally identifiable information as part of the proposed electronic data exchange and (ii) information of the proposed electronic data exchange extracted by the computing device from a digital representation of the proposed electronic data exchange. The data exchange information may include (a) a characteristic of the proposed electronic data exchange, and (b) an identifier of the entity associated with the characteristic. For example, reception module 104 may, as part of backend computing system 206 in FIG. 2, receive, from computing device 202, authentication token 122 for a proposed electronic data exchange, as further described above.

As used herein, the term "user of the computing device" generally refers to either the party that is proposing the electronic data exchange or the party that is accepting the proposed electronic data exchange. For example, the term "user of the computing device" may refer to either the buyer or the seller in a proposed electronic transaction. Accordingly, either the buyer or the seller may generate the digital representation of the proposed electronic data exchange, and the respective counterparty may extract the data exchange information from the generated digital representation and then generate and transmit the authentication token, as described further below.

As used herein, the term "authentication token" generally refers to a digitally encoded data structure that is created by a computing device to indicate that a first party authorizes a corresponding transaction that was previously offered or proposed by a second party by generating, displaying, and/or transmitting the digital representation of the proposed electronic data exchange.

Additionally, as described herein, the term "anonymized identifier" generally refers to an identifier that is configured such that an intended intermediary recipient (e.g., intermediary broker) of the authentication token may determine, identify, and/or authenticate the transmitting user (and if anonymized, the entity proposing the electronic data exchange) by using the anonymized identifier as a key (e.g., based on secret information that the intended recipient possesses). In this example, an eavesdropper or unintended recipient would be unable to identify the transmitting user based on this information (e.g., without possessing the corresponding secret information that the intended recipient possesses). In general, the term "secret" generally indicates that the anonymized identifier for one party is kept secret from at least the counterparty to the transaction. In other examples, the anonymized identifier may be secret in the sense that only the party corresponding to the anonymized identifier and the intermediary both possess the secret knowledge.

As a specific example, the anonymized identifier may correspond to "3843724." The intended recipient, such as a centralized broker, may possess secret information that maps this anonymized identifier, "3843724," to the personally identifiable information, "John Smith." Accordingly, an eavesdropper or unintended recipient would be unable to identify John Smith based on the anonymized identifier, which otherwise appears to be a random or quasi-random number, in the absence of secret mapping information that maps the anonymized identifier to the corresponding personally identifiable information.

In cases where one of the parties uses an anonymized identifier rather than personally identifiable information, the other party may optionally use either its respective anonymized identifier or its personally identifiable information (e.g., one of the parties may be anonymous or both parties may be anonymous). For example, the entity identifier of the data exchange information may or may not be anonymized.

Additionally, as used herein, the term "personally identifiable information" generally refers to information that directly identifies, or helps to identify, a user, person, or entity, without the use of secret mapping information, and which is generally regarded as part of the entity's public or directly identifiable identity. Accordingly, the term "personally identifiable information," as used herein, is generally distinct from the anonymized identifier, as discussed further above. Illustrative examples of personally identifiable information include an entity's name, address, phone number, Social Security number, tax identification number, bank account number, address, credit card number, and/or any one or more field values that help compose any of these items (e.g., address number, address street, address city, etc.). Notably, as used herein, the term "personally identifiable information" generally does not include INTERNET PROTOCOL addresses, MEDIA ACCESS CONTROL addresses, and other network identifiers that are inherent to Internet and other network communications.

Additionally, as described herein, the term "electronic data exchange" generally refers to the exchange of an amount (e.g., of credits, monetary units, dollars, cryptographic currency units, etc.) and/or a digital entity (e.g., confidential information, secrets, a medical record, a financial record, and/or computing resource access authorization, etc.) from one digital account for a first party of the exchange to another digital account of a second party of the same exchange. In one illustrative embodiment, the electronic data exchange may correspond to a financial transaction from a customer's bank account to a seller's bank account to complete or finalize a transaction for goods or services, as discussed further below.

Reception module 104 may receive the authentication token in a variety of ways. In general, reception module 104 may receive the authentication token without the entity that generated the digital representation of the proposed electronic data exchange receiving any of the user's personally identifiable information as part of the proposed electronic data exchange. Even more generally, reception module 104 may receive the authentication token without the user entering personally identifiable information into computing device 202 (e.g., without a customer entering personally identifiable information into a smartphone that extracts the characteristic from the digital representation, generates the authentication token, and transmits the authentication token to backend computing system 206). Accordingly, computing device 202 may participate in the electronic data exchange without transmitting personally identifiable information and reception module 104 at backend computing system 206 may participate in the same electronic data exchange without receiving personally identifiable information. Accordingly, the electronic data exchange may take place without personally identifiable information entering any part of the electronic data exchange, thereby logically preventing an eavesdropper, attacker, or unintended recipient from obtaining the personally identifiable information.

Notably, although the user may not transmit personally identifiable information as part of the electronic data exchange, the user may have previously transmitted one or more items of personally identifiable information as part of a prefatory registration process. For example, a buyer and/or seller may register with backend computing system 206 (e.g., a backend security server of a security vendor, such as SYMANTEC CORPORATION). As part of the registration process, or in response to the registration process, reception module 104 may establish and/or maintain user accounts for the buyer and/or seller. Reception module 104 may also generate an anonymized identifier for the buyer and/or seller. Additionally, reception module 104 may maintain secret mapping information that maps the anonymized identifier to the previously-received personally identifiable information and/or the corresponding user account.

Reception module 104 may additionally provide the anonymized identifier to the buyer and/or seller, respectively. Upon receiving the anonymized identifier, the buyer and/or seller (and their corresponding computing devices, such as a buyer's smartphone, a website maintenance computer, and/or a seller's point-of-sale device) may insert the corresponding anonymized identifier into the digital representation of the proposed electronic data exchange and/or into the authentication token, as discussed further below in accordance with method 300.

As used herein, the term "digital representation" generally refers to digital information that is encoded within a display or wireless data stream exterior to computing device 202, such that computing device 202 identifies the digital representation through sensor scanning and/or wireless network reception, as discussed further below. In illustrative embodiments, the digital representation is encoded within a barcode or near field communication data stream.

As used herein, the term "entity associated with the characteristic" generally refers to the entity that generates or is responsible for generating the digital representation of the proposed electronic data exchange. As such, it generally represents the party proposing the electronic data exchange. And the party that receives the digital representation and generates the authentication token therefrom is the "user." Thus, the "user" and "entity" are the opposing parties to the proposed transaction.

As used herein, the term "characteristic of the proposed electronic data exchange" generally refers to any feature, attribute, field value, and/or other characteristic that establishes or proposes a governing or identifying term for the electronic data exchange. Examples of the characteristic of the proposed electronic data exchange extracted by the computing device from the digital representation include (i) an identifier of a product associated with the proposed electronic data exchange (e.g., an identifier for a product that is being purchased according to the electronic data exchange), and (ii) an identifier of the proposed electronic data exchange (e.g., a transaction ID that identifies the specific and unique transaction that is being completed according to the electronic data exchange).

More generally, examples of the characteristic of the proposed electronic data exchange may include an identifier of the product or service that is the subject of the corresponding transaction, a price of the transaction, a quantity of goods or services being purchased, a term of a sales contract or other contract that defines the transaction, a date or timing for completing or processing the transaction, and/or any other item of information that helps define, partially or entirely, the corresponding transaction for the electronic data exchange. Additionally, although computing device 290 may insert only a single characteristic into the authentication token, computing device 290 may also optionally insert multiple characteristics, according to any permutation of the various examples of characteristics described above, into the authentication token.

In further examples, reception module 104 may receive a cryptographic protocol certificate for an entity that is proposing the electronic data exchange (e.g. a seller of goods). Examples of the cryptographic protocol certificate may correspond to the SECURE SOCKETS LAYER or TRANSPORT LAYER SECURITY protocols and their certificates. Authentication module 112 may then authenticate the cryptographic protocol certificate (e.g., by verifying that the cryptographic protocol certificate has been signed by a certificate authority that verifies the information contained within the certificate).

Optionally, reception module 104 may then encrypt communications with the entity (e.g., the seller) using a public key that corresponds to the authenticated cryptographic protocol certificate. Reception module 104, and/or authentication module 112 (in accordance with step 304, as discussed further below), may perform these authentication procedures, with respect to the cryptographic protocol certificate, as a mechanism for authenticating the entity that is proposing the electronic data exchange. In general, this authentication process may be performed prior to authorizing completion of the proposed electronic data exchange, and as a condition of authorizing completion of the proposed electronic data exchange. In other words, authentication module 112 may optionally perform two-way authentication that authenticates the buyer and/or seller using a respective anonymized identifier and/or a respective cryptographic protocol certificate for either or both parties, as further discussed below.

Reception module 104 may receive an authentication token that includes a digital representation extracted from a variety of locations. In illustrative embodiments, computing device 202 may extract the digital representation of the proposed electronic data exchange from (i) a website of an entity that generated the digital representation of the proposed electronic data exchange and/or (ii) a physical location of the entity. This can be accomplished, e.g., using a camera or scanning device corresponding to computing device 202. More generally, computing device 202 may extract the digital representation of the proposed electronic data exchange from any location where the buyer and/or seller may propose the electronic data exchange by generating, displaying, and/or transmitting the digital representation (e.g., a barcode or data structure encoded within a wireless data stream), as discussed further below. In one specific embodiment, the physical location of the entity may correspond to a retail location of a vendor or seller, such as a grocery store.

Figure 4:
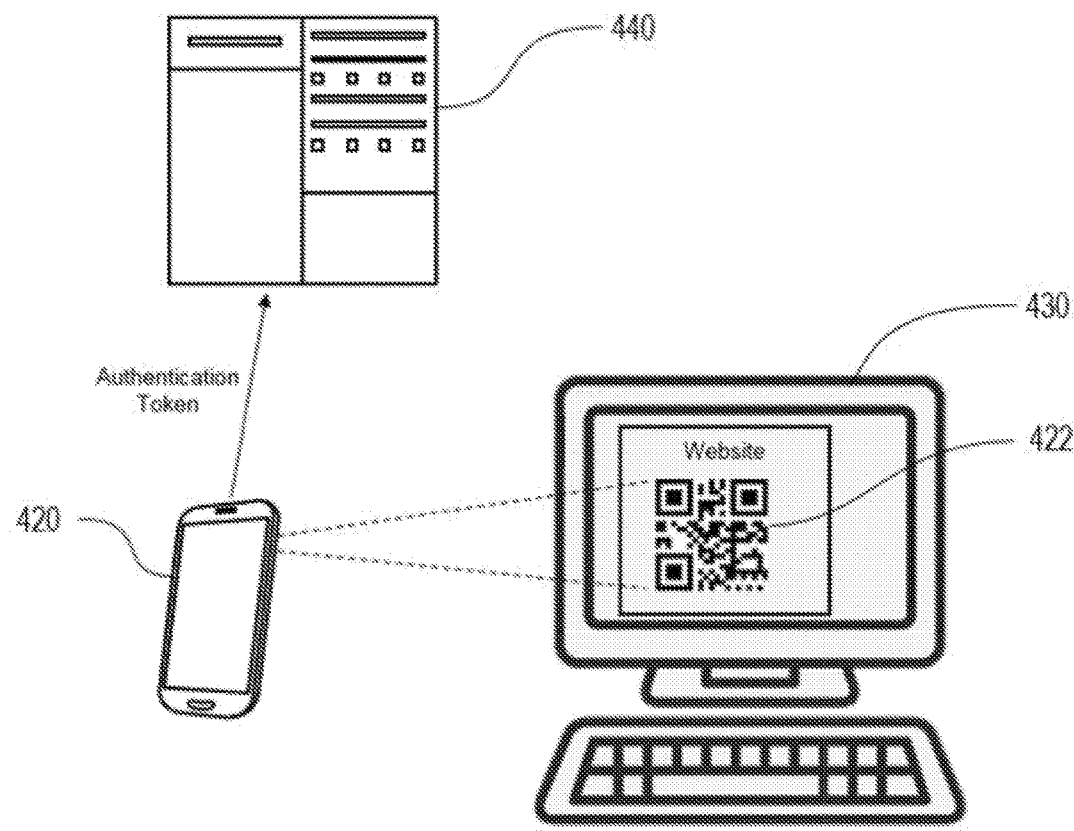
FIG. 4 is a block diagram of a smartphone and desktop computing system implementing the disclosed system according to one embodiment.

FIG. 4 shows an example in which the disclosed systems and methods may be used. This figure is directed to an embodiment that may enable a user to purchase a product online in an e-commerce environment. In this example, a smartphone 420, which may act as computing device 202, extracts data exchange information from a digital representation 422 of a proposed electronic data exchange from a website displayed by a computer 430, which may act as computing device 290. A user of smartphone 420 and computer 430 may use a browser of computer 430 to view a product available on an e-commerce website or portal. As shown, the e-commerce website may display a digital representation, which in this case may correspond to a QR code, that corresponds to an offer for the user to purchase specific good(s) or service(s) from an entity associated with the website.

The user may orient a camera of smartphone 420 such that the camera successfully captures an image of digital representation 422. Alternatively, the user of smartphone 420 may scan digital representation 422 using any other scanning device of the smartphone. In other words, in the example of FIG. 4, smartphone 420 may extract digital representation 422 of the proposed electronic data exchange by scanning a matrix barcode using a digital camera of smartphone 420. In this example, the proposed electronic data exchange may include an offer to sell at least one of goods and services (e.g., item "A") from an entity (e.g., GENERICSTORE.COM) to the user of smartphone 420.

The smartphone may extract the data exchange information from the captured image, which may include a characteristic of the vendor's offer and an identifier of the vendor. Upon extracting the data exchange information from the digital representation, smartphone 420 may generate and transmit an authentication token to the backend computing system using any suitable transmission mechanism, including a wireless or wired network. In an illustrative embodiment, smartphone 420 may transmit the authentication token to a backend security server 440 of a security vendor, such as SYMANTEC CORPORATION, via a wireless network connection, such as a Wi-Fi Internet connection or cellular data Internet connection. Backend security server 440, which may act as backend computing system 206, may receive the authentication token from smartphone 420 and perform one or more of steps 302, 304, 305 and 306, as discussed further below.

Figure 5:
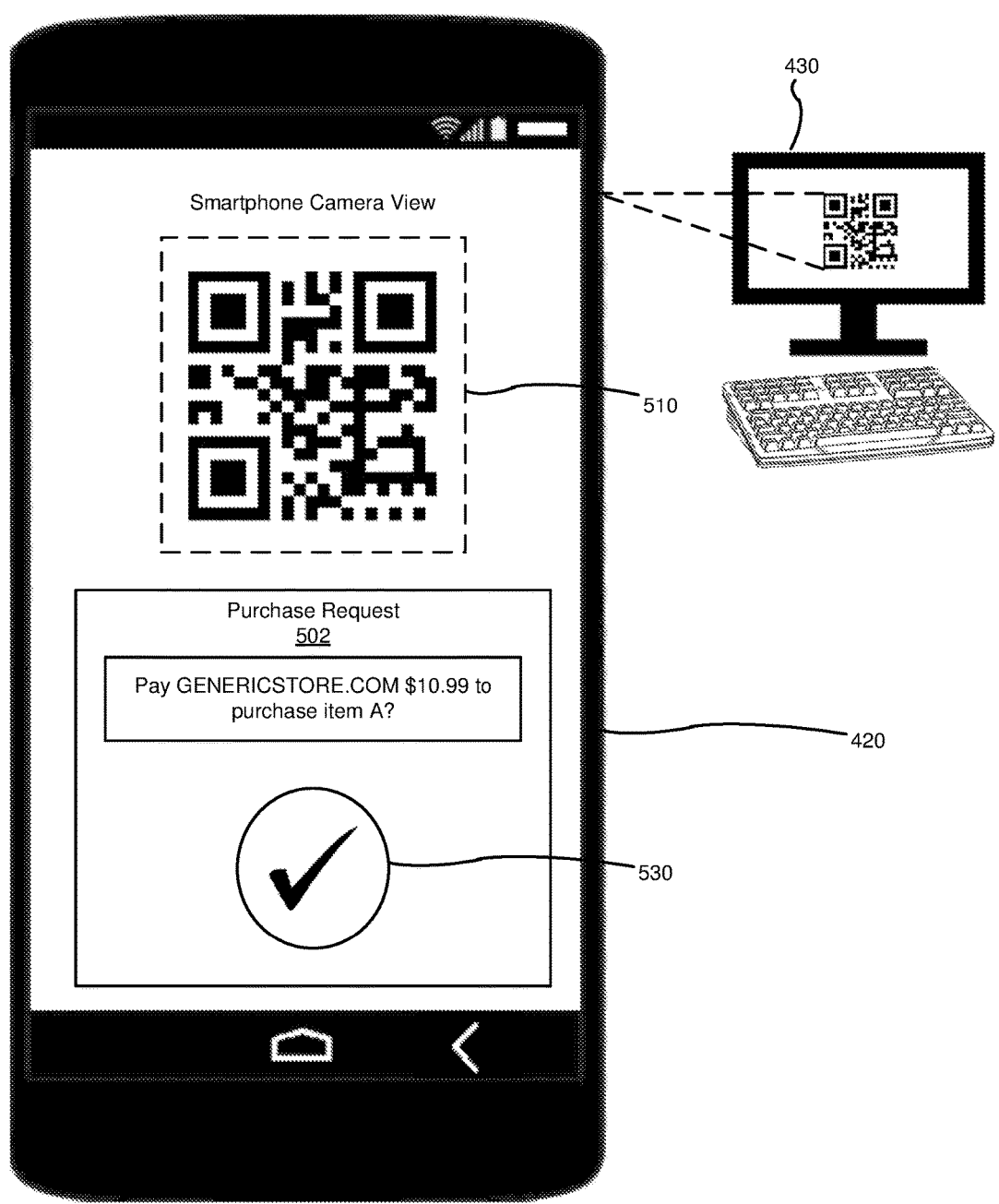
FIG. 5 is a block diagram of a smartphone display implementing the disclosed system according to one embodiment.

In some embodiments, computing device 202 may require user confirmation prior to transmitting the authentication token. FIG. 5 shows another illustration of smartphone 420 according to one embodiment. In the example of FIG. 5, smartphone 420 may display a purchase request 502, which specifies information about the proposed e-commerce transaction extracted by smartphone 420 from the digital representation and requests confirmation from the user to accept the offer. Accordingly, the user may accept the offer to purchase the specific good(s) by simply selecting or toggling a checkmark button 530. Once the offer is accepted, smartphone 420 may generate the authentication token and transmit the authentication token to backend computing system 206, thereby completing the transaction. Notably, in this example, smartphone 420 may also optionally display a smartphone camera view 510 of the barcode captured by the smartphone camera.

Figure 6:
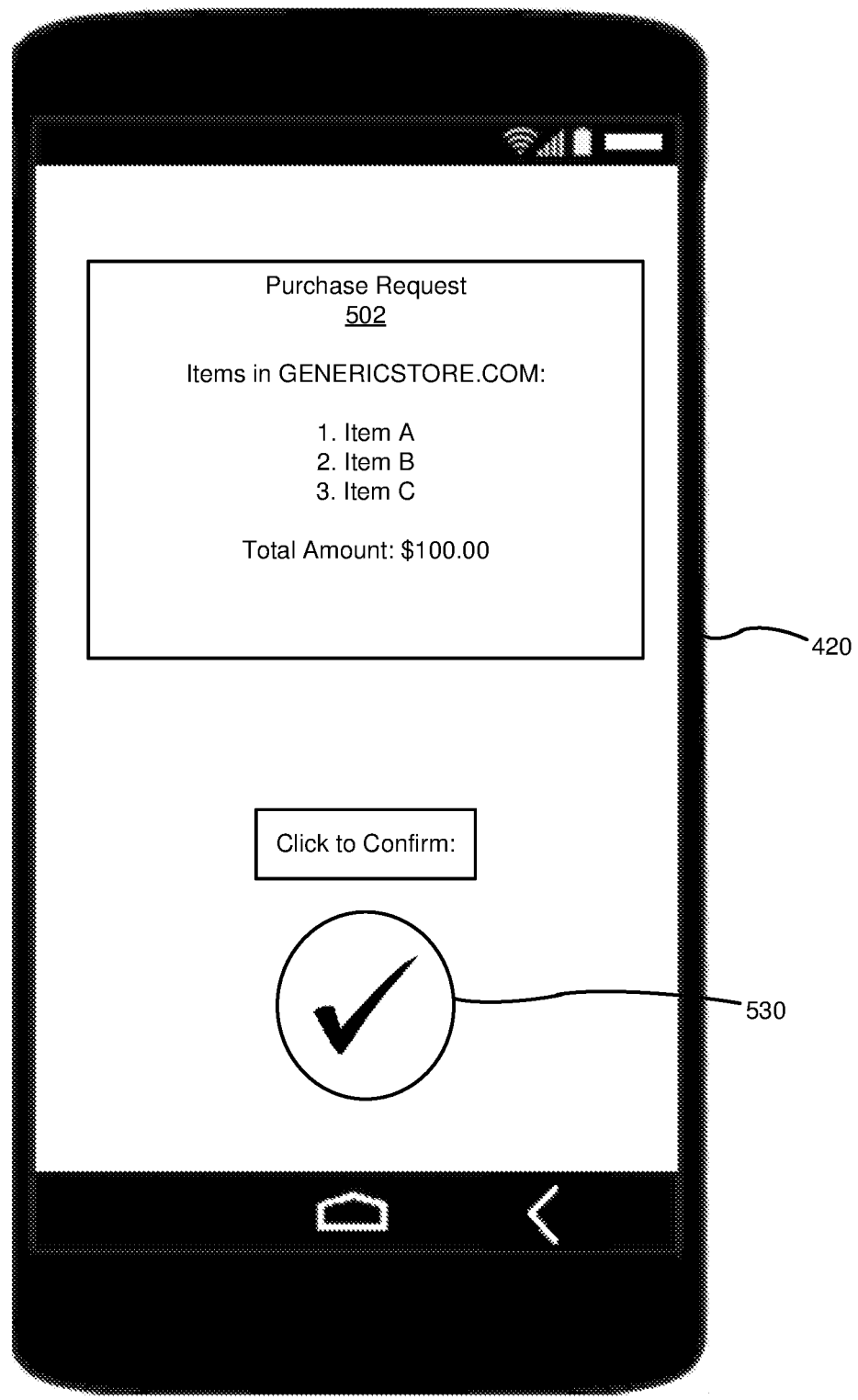
FIG. 6 is a block diagram of a smartphone display implementing the disclosed system according to one embodiment.

For completeness, FIG. 6 also shows another view of smartphone 420 and purchase request 502. In this example, the smartphone camera view 510 is omitted, and purchase request 502 is expanded to show further details of the proposed electronic data exchange. More specifically, in this example, purchase request 502 further shows a listing of items to be purchased, as well as a total amount of the cost for all of the items to be purchased.

In further embodiments, computing device 202 may authenticate the user's identity prior to transmitting the authentication token. For example, smartphone 420 may authenticate the user's identity by (i) verifying biometric data provided by the user (e.g., a fingerprint of the user) and/or (ii) verifying digital authentication credentials provided by the user (e.g., a digital pin code that corresponds to the user). Additionally, or alternatively, computing device 202 may authenticate the user's identity using any other suitable authentication mechanism, such as an alphanumeric password and/or challenge-response question and answer session.

Additionally, or alternatively, in some examples a customer may desire to remain anonymous with respect to a merchant while also having the merchant deliver goods or services to the customer's location. In these examples, system 200 may optionally be configured to (i) prevent the user's address from reaching the merchant, (ii) delaying the revealing of the user's address until one or more subsequent stages of the proposed electronic data exchange and/or authentication process, and/or (iii) compartmentalizing the revealing of the user's address to one or more individuals or services that are necessary to successfully deliver the goods or services, while still preventing the address from being revealed to other individuals or services associated with the merchant. In a specific example, system 200 may optionally be configured to enable a delivery service, such as FEDEX or UPS, to look up the user's address, at a subsequent time of delivering the goods or services, without the merchant ever discovering the user's address. In particular, the delivery service may perform an additional and subsequent electronic data exchange to obtain authorization to receive the user's address without ever exposing the address to the merchant.

In sum, the user may quickly and conveniently purchase the good(s) or service(s) offered on the e-commerce website, without submitting personally identifiable information to the website or even to the user's smartphone, by using the smartphone to capture an image of the digital representation displayed on the website and sending an automatically generated authentication token to a backend server.

Figure 7:
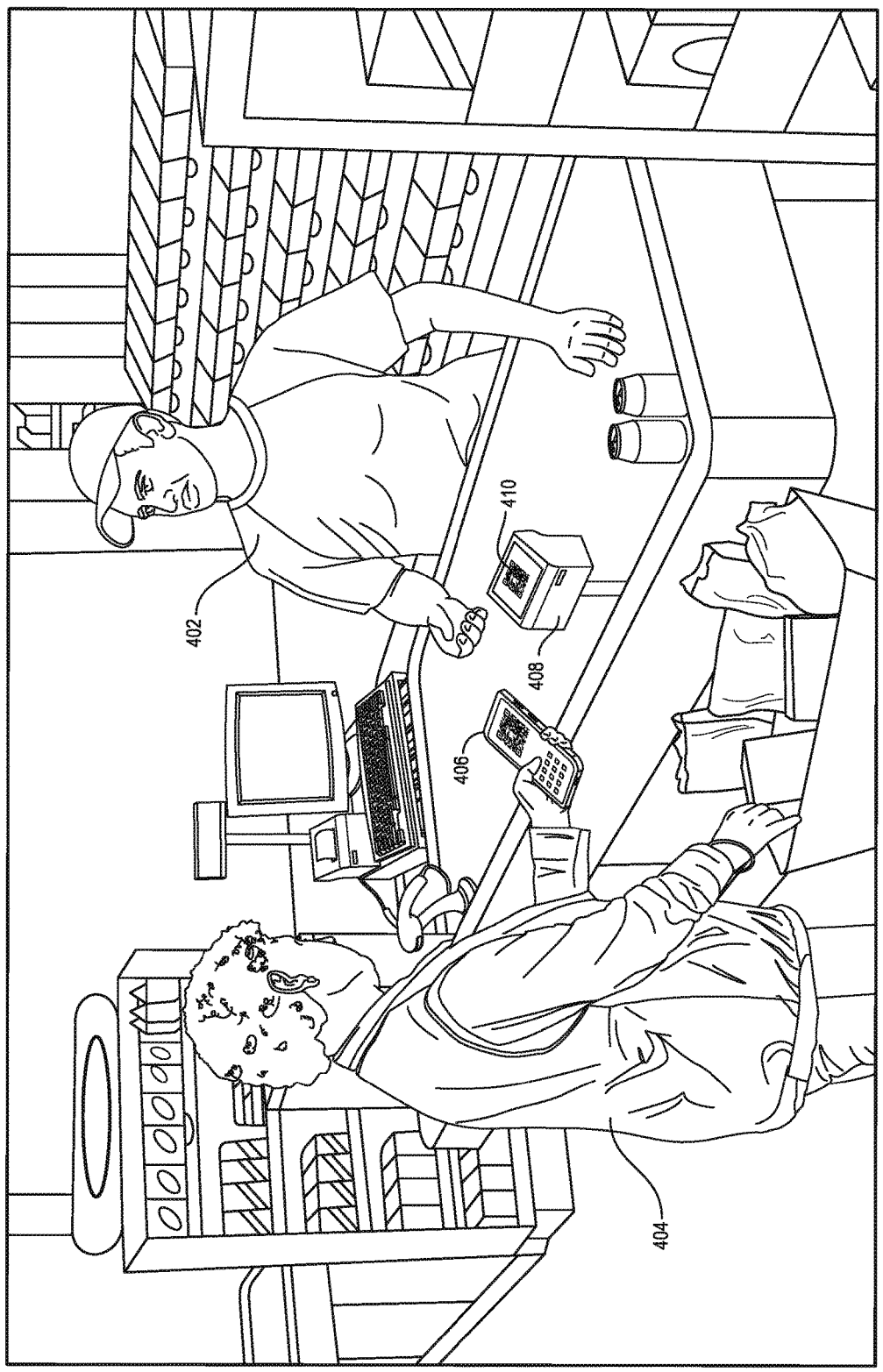
FIG. 7 is a block diagram of a grocery store checkout lane implementing the disclosed system according to one embodiment.

FIG. 7 shows another example in which the disclosed systems and methods may be used. This figure is directed to an embodiment that may enable a user to purchase a product at a point-of-sale location. In this example, a customer 404 and the customer's smartphone 406, which may act as computing device 202, extract the data exchange information from a digital representation of a proposed electronic data exchange from a point-of-sale device 408, which may act as computing device 290. In this example, customer 404 may stand at the checkout line of a grocery store, which is being handled by a grocery store cashier 402. Customer 404 may hold smartphone 406 over point-of-sale device 408, which may include a display 410 that displays the digital representation of the proposed electronic data exchange (e.g., a barcode, such as a matrix barcode and/or a QR code). Customer 404 may orient a camera of smartphone 406 such that the camera successfully captures an image of display 410 (and, specifically, successfully captures the digital representation within display 410). Additionally, or alternatively, customer 404 may orient smartphone 406 such that a wireless transceiver, such as a near field communications (NFC) transceiver, successfully receives the digital representation as encoded within an NFC wireless data stream (or any other suitable wireless protocol data stream, as transmitted from point-of-sale device 408, the cash register, a retail location wireless server, and/or any other seller computing device).

In other words, in the example of FIG. 7, smartphone 406 may extract the digital representation of the proposed electronic data exchange by scanning a matrix barcode using a digital camera of smartphone 406. In this example, the proposed electronic data exchange may include an offer to sell at least one of goods and services (e.g., two soda cans) from the grocery store to the user of smartphone 406. Furthermore, a vendor (e.g., cashier 402) may display the matrix barcode (e.g., at display 410) to offer the proposed electronic data exchange to the user of smartphone 406.

The smartphone may then extract the data exchange information from the captured image, which may include a characteristic of the offer and an identifier of the entity making the offer, e.g., the grocery store. Upon extracting the data exchange information from the digital representation, computing device 202 may generate and transmit the authentication token to backend computing system 206 using any suitable transmission mechanism, including a wireless or wired network. In an illustrative embodiment, smartphone 406 may transmit the authentication token to backend computing system 206, which may correspond to a backend security server of a security vendor, such as SYMANTEC CORPORATION, via a wireless network connection, such as a Wi-Fi Internet connection or cellular data Internet connection. Backend computing system 206 may then receive the authentication token from computing device 202 and perform one or more of steps 302, 304, 305, and 306, as discussed further below.

In some examples, an entity may generate the digital representation of the proposed electronic data exchange in response to receiving an indication, from the user, to complete the proposed electronic data exchange. For example, point-of-sale device 408 may generate the digital representation (e.g., a QR code, as described above) in response to customer 404 indicating a desire or intention to complete the proposed electronic data exchange, which may thereby trigger or motivate cashier 402 to press a key, or otherwise enter input, that further triggers generation of the digital representation on display 410.

Alternatively, the parties may essentially reverse positions such that customer 404 enters input at smartphone 406 to generate the digital representation (e.g., a barcode or a data structure encoded within a wireless data stream) on smartphone 406. Customer 404 may enter this input in response to receiving an indication from cashier 402 of a desire or intention to complete the proposed electronic data exchange. In some examples, the mere display of a price on a product, or other indirect display of an intention to make a sale or propose a transaction, may correspond to the indication that triggers generation of the digital representation, as further discussed above. In additional examples, the digital representation may be displayed, or affixed, directly on one or more goods or products, and a customer may quickly and conveniently purchase the corresponding product by simply capturing the digital representation and transmitting the authentication token, in accordance with method 300.

Figure 8:
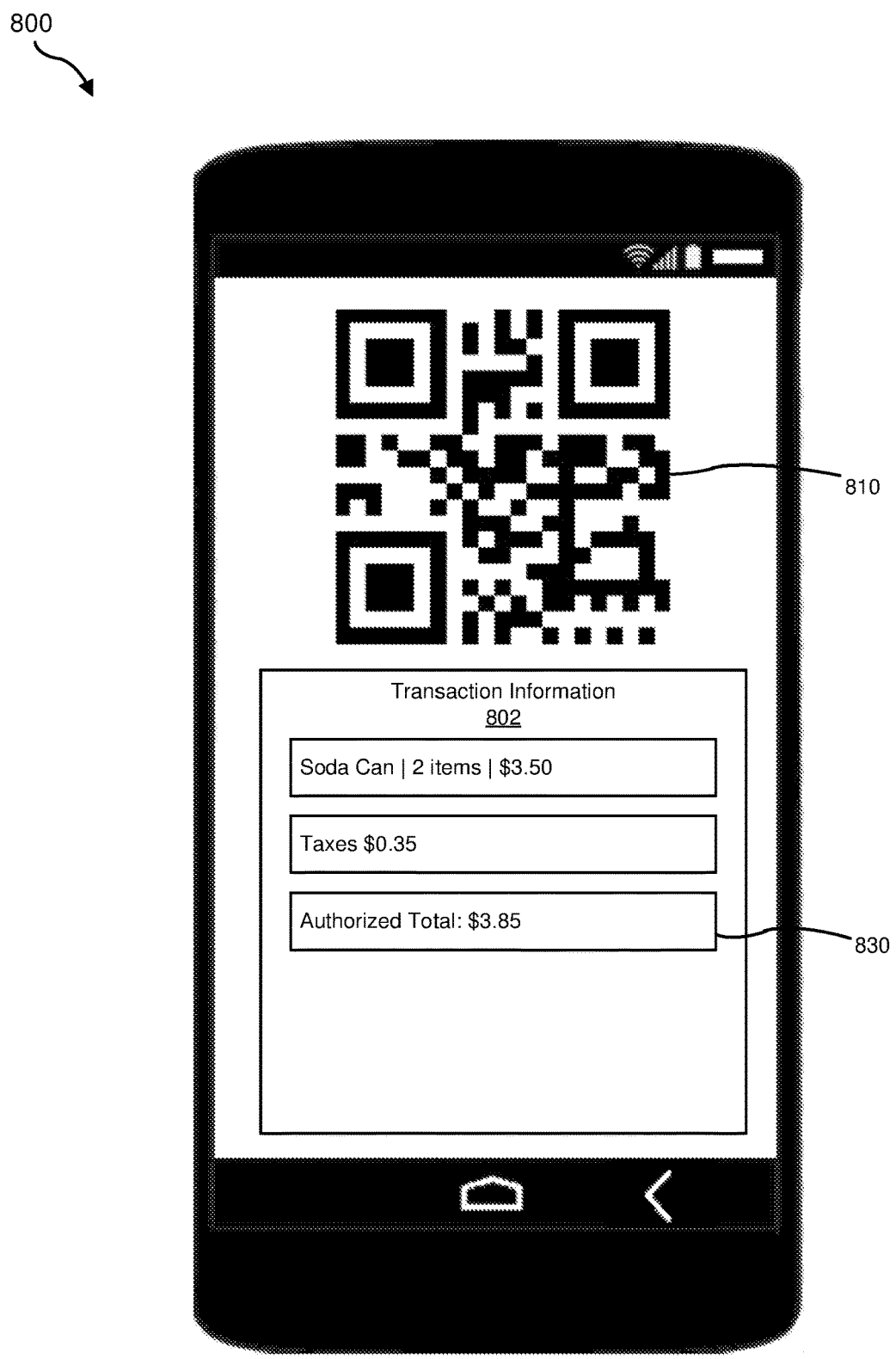
FIG. 8 is a block diagram of a smartphone display implementing the disclosed system according to one embodiment.

FIG. 8 shows an illustration of an example smartphone 800 according to an alternative embodiment, as first discussed above. In this example, smartphone 800 may correspond to smartphone 406 of FIG. 7. As further shown in FIG. 8, smartphone 800 may display a digital representation 810 and transaction information 802. Transaction information 802 may specify one or more terms of the proposed electronic data exchange. In the example of FIG. 8, transaction information 802 specifies an item ("Soda Can"), a number of items to be purchased ("2 items"), a pre-tax price of the items to be purchased ("$3.50"), a taxation amount ("$0.35"), and an authorized total 830 ("$3.85"). Upon reviewing transaction information 802, customer 404 may enter input (e.g., audibly or manually) to generate digital representation 810. Cashier 402 may then use any suitable scanning mechanism to scan digital representation 810 (e.g., a barcode scanner at the grocery store checkout line), as displayed on smartphone 800, to thereby extract the characteristic, generate the authentication token, and transmit the authentication token to backend computing system 206. Notably, in the reverse example of FIG. 7, transaction information 802 may be displayed, in a parallel manner, on display 410 of point-of-sale device 408, the cash register, and/or any other suitable computing device available to the seller or cashier.

In further examples, computing device 202 may authenticate the user's identity prior to transmitting the authentication token. In the example of FIG. 7, smartphone 406 may authenticate the identity of customer 404 prior to transmitting the authentication token. In the example of FIG. 8, point-of-sale device 408 and/or the cash register may authenticate the identity of the cashier (or the identity of the seller more generally) prior to transmitting the authentication token. In these examples, the computing device may authenticate the user's identity by (i) verifying biometric data provided by the user (e.g., a fingerprint of the user) and/or (ii) verifying digital authentication credentials provided by the user (e.g., a digital pin code that corresponds to the user). Additionally, or alternatively, the computing device may authenticate the user's identity using any other suitable authentication mechanism, such as an alphanumeric password and/or challenge-response question and answer session.

At step 304, one or more of the systems described herein may prevent the user's personally identifiable information from entering the proposed electronic data exchange by identifying the user using the anonymized identifier rather than using the user's personally identifiable information. For example, prevention module 106 may, as part of backend computing system 206 and/or computing devices 202 and/or 290 in FIG. 2, prevent the user's personally identifiable information from entering the proposed electronic data exchange by using anonymized identifier 124 to identify the user rather than using the user's personally identifiable information.

Prevention module 106 may prevent the user's personally identifiable information from entering the proposed electronic data exchange in a variety of ways. In general, prevention module 106 may, as part of the registration process described above, configure the computing device (e.g., smartphone 420 in FIG. 4, smartphone 406 in FIG. 7, or point-of-sale device 408 in the embodiment of FIG. 8) in one or more of the following ways. In one example, the computing device is configured such that the computing device secretly possesses the anonymized identifier (e.g., the anonymized identifier is encoded or encrypted within software and/or hardware such that the anonymized identifier is kept secret from the user and/or others besides the user). In one specific example, not even the user can extract the anonymized identifier (or the user's private key) from the computing device (i.e., due to one or more security measures that protect the anonymized identifier, such as a TRUSTED PLATFORM MODULE) and/or only the computing device (and not the user manually) can successfully transmit the anonymized identifier to backend computing system 206.

At step 305, one or more of the systems described herein may authenticate the user and/or the entity that generated the representation of the electronic data exchange. For example, authentication module 112, at computing device 202, may authenticate the user. As used herein, the phrase "authenticating the user" generally refers to authenticating and/or validating the user in a manner that establishes a level of trust that the transmitter of the anonymized identifier corresponds to the actual user rather than an eavesdropper, attacker, or other accidental, unintended, and/or unauthorized party to the proposed electronic data exchange.

In one example, authentication module 112 may be located at the user's computing device, which may correspond to computing device 202. For example, the computing device may be configured to solicit the user to authenticate the user's identity (e.g., using biometric verification and/or digital authentication credentials verification) in order to transmit the anonymized identifier.

In further examples, authentication module 112 may be located at a centralized intermediary server, which may correspond to backend computing system 206, as further discussed above. In one example, computing device 202 may be configured such that the computing device will transmit the anonymized identifier according to an encryption, transmission, and/or network protocol that verifies the user's identity (e.g., digitally signs the anonymized identifier using a private key that prevention module 106 assigned to the user as part of the registration process). Backend computing system 206 can authenticate the user based on receipt of this transmission.

In some examples, authentication module 112 may authenticate the user based merely on receipt of the anonymized identifier (e.g., because the anonymized identifier is presumably kept secret and only possessed by the actual user). In other examples, authentication module 112 may authenticate the user based on receipt of the anonymized identifier and successful completion of one or more further authentication steps (e.g., verification that the anonymized identifier was digitally signed using a private key that prevention module 106 assigned to the user and/or computing device 202). For example, backend computing system 206 can also optionally authenticate the user by matching or comparing the transmitted anonymized identifier with network packet payload data or metadata, such as an Internet protocol address or media access control address that is previously defined, at authentication module 112, as corresponding to the anonymized identifier.

Additionally, or alternatively, authentication module 112 may authenticate the user based on device-level encryption and/or disk encryption. In general, authentication module 112 may identify, in the prefatory registration process, one or more features of the user's computing device, such as computing device 202, smartphone 420, and/or smartphone 406. Authentication module 112 may log one or more of these features to identify and authenticate the corresponding computing device. Examples of these features may include an INTERNET PROTOCOL address, a MEDIA ACCESS CONTROL address, a globally unique identifier, a serial number, and/or any other suitable device identifier. Additionally, or alternatively, authentication module 112 may establish that the computing device encrypts, or decrypts, communications using a private key (e.g., through digital signing, optionally performed through a TRUSTED PLATFORM MODULE). In these examples, authentication module 112 may authenticate the user in response to verifying that the computing device is communicating using the corresponding private key. In general, authentication module 112 may obtain a signature that uniquely identifies software features and/or hardware features of the computing device, thereby enabling authentication module 112 to subsequently identify the computing device by verifying whether the computing device still indicates the same signature.

At step 305, authentication module 112 may additionally, or alternatively, authenticate the entity identified in the data exchange information. In one example, reception module 104 may receive a cryptographic protocol certificate for the entity proposing the electronic data exchange (e.g. a seller of goods). Examples of the cryptographic protocol certificate may correspond to the SECURE SOCKETS LAYER or TRANSPORT LAYER SECURITY protocols and their certificates. Authentication module 112 may authenticate the cryptographic protocol certificate (e.g., by verifying that the cryptographic protocol certificate has been signed by a certificate authority that verifies the information contained within the certificate). Optionally, reception module 104 may then encrypt communications with the entity (e.g., the seller) using a public key that corresponds to the authenticated cryptographic protocol certificate.

Additionally, or alternatively, authentication module 112 may authenticate the user and/or counterparty by verifying that the user's computing device has transmitted information that corresponds to, or is consistent with, the outcome of the prior registration process. For example, a corporation such as AMAZON may register with the centralized intermediary to enable future payment transactions. Subsequently, a user may wish to purchase an item from AMAZON. Accordingly, the user's smartphone may transmit an authentication token to the centralized intermediary, such as backend computing system 206, and the authentication token may include a version of entity identifier 127 that identifies AMAZON. Authentication module 112 may have assigned the specific entity identifier to AMAZON during the prefatory registration process. In response, backend computing system 206 may look up AMAZON using entity identifier 127 and thereby verify that AMAZON has previously registered with backend computing system 206. In contrast, if the authentication token includes a version of entity identifier 127 that does not identify a merchant, or counterparty, the previously registered with backend computing system 206, then backend computing system 206 may fail the proposed electronic data exchange. Backend computing system 206 may also optionally notify the user about the corresponding security threat or breach.

At step 306, one or more of the systems described herein may, in response to authenticating the user and/or entity, authorize completion of the proposed electronic data exchange. For example, authorization module 108 may, as part of backend computing system 206 in FIG. 2 and in response to authentication module 112 authenticating the user and/or entity, authorize completion of the proposed electronic data exchange. As used herein, the phrase "authorize completion of the proposed electronic data exchange" generally refers to performing a step or action that initiates or triggers completion of the proposed electronic data exchange. In an illustrative embodiment, authorization module 108 may authorize completion of the proposed electronic data exchange by transmitting authorization to a corresponding account service, as discussed further below.

Authorization module 108 may authorize completion of the proposed electronic data exchange in a variety of ways. In some examples, authorization module 108 may authorize completion of the proposed electronic data exchange by authorizing an account service to complete the proposed electronic data exchange. More specifically, authorization module 108 may (i) transmit account information for the user to an account service that manages a user account for the user and/or (ii) transmit, to the account service, account information for an entity that generated the digital representation of the proposed electronic data exchange.

In an illustrative embodiment, the account service may correspond to a payment service, such as PAYPAL or a bank wire transfer service. Furthermore, in these examples, the account service may use the account information to complete the proposed electronic data exchange by (i) transferring an amount from the user account to another account (such as a vendor's account) and/or (ii) transferring an amount from another account to the user account. In an illustrative embodiment, authorization module 108 may transmit bank account information (e.g., account and routing numbers) for both the buyer and seller of a proposed transaction to purchase goods and/or services. The account service may then use the received bank account information to deduct the sale amount from the buyer's bank account and credit the same sale amount to the seller's bank account. In alternative embodiments, the account service may transfer or copy confidential information, intellectual property, a medical record, and/or a financial record to complete the transaction (e.g., a current possessor of secret information may authorize copying or transmission of that information, for free or in exchange for barter or monetary payment, in accordance with method 300).

In additional or alternative examples, authorization module 108 and/or the account service may perform one of the following to complete the transaction: (i) successfully login a user attempting to login to a website, portal, system, and/or service, (ii) successfully register or reserve a party or customer for an event or service (e.g., travel booking for flights, rental cars, and/or hotels, etc.), and/or (iii) adjust a customer's account, profile, and/or standing to reflect completion of the electronic data exchange (e.g., adjust a credit card or bank account profile, maintain or preserve a customer's good credit, line of credit, remaining credit, etc.). In another specific example, authorization module 108 may enable a peer-to-peer transaction without actually performing any part of the transaction (e.g., such as a peer-to-peer file transaction or a payment transaction). In these examples, the parties may simply leverage method 300 to authenticate each other (e.g., one or both parties may receive an authentication notification for the respective counterparty from backend computing system 206) without one or both parties entering personally identifiable information, after which the parties may trust each other and thereafter complete the peer-to-peer transaction.

Figure 9:
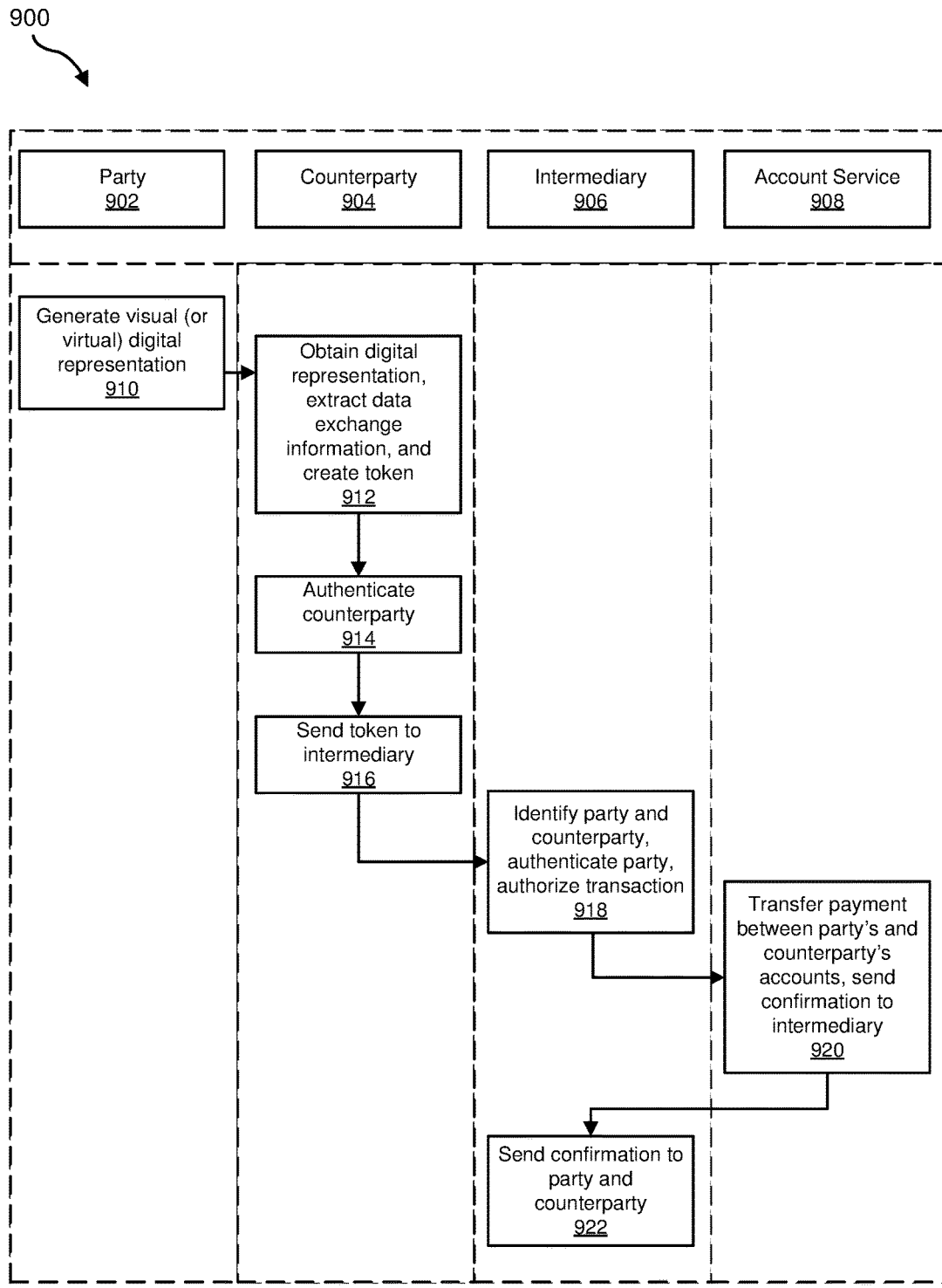
FIG. 9 is a flow diagram of an example method for protecting personally identifiable information during electronic data exchanges.

FIG. 9 is a flow diagram of a method 900 for protecting personally identifiable information during electronic data exchanges. Method 900 may further correspond to a more detailed and concrete embodiment of the systems and methods described herein. Notably, FIG. 9 illustrates four different entities that may each be involved in an electronic data exchange: a party 902, a counterparty 904, an intermediary 906, and an account service 908 (e.g., a payment center). Party 902 and counterparty 904 may respectively correspond to the "entity" and "user" discussed above, which may respectively correspond to computing devices 202 and 290. Intermediary 906 may correspond to a centralized intermediary, such as a backend security server (e.g., backend computing system 206) of a security vendor that provides a single source of truth for monetary payments, as further discussed above. Account service 908 may correspond to an actual financial or monetary (or other) account center that actually maintains the amounts or entities within user accounts that are transferred according to electronic data exchanges, and in response to authorization from authorization module 108.

Notably, one or more of the steps within method 900 may be optional, including especially the steps where the account service actually performs the electronic data exchange (instead of intermediary 906, which may be optionally combined with account service 908), and the steps of transmitting confirmation notifications to party 902, counterparty 904, and/or intermediary 906.

As further shown in FIG. 9, method 900 may begin at a step 910, at which point party 902 may generate or cause to be generated a visual digital representation of a proposed electronic data exchange. For example, computer 430 in FIG. 4 or point-of-sale device 408 in FIG. 7 may generate a digital representation of the proposed electronic data exchange. For example, the digital representation may correspond to a visual code, barcode, matrix barcode, QR code, and/or 3D barcode. Additionally, or alternatively, party 902 may generate a virtual digital representation by encoding the digital representation of the proposed electronic data exchange as a data structure within a wireless data stream (e.g., a near field communication stream), as further discussed above. Party 902 may correspond to the entity identified in the encoded digital representation.

At step 912, counterparty 904 (e.g., the "user" using computing device 202) may scan or otherwise obtain the digital representation, extract the data exchange information therefrom, and create a corresponding authentication token. For example, smartphone 420 in FIG. 4 or smartphone 406 in FIG. 7 may use a camera, or other sensor, to scan a barcode shown on computer 430 or on display 410 of point-of-sale device 408. The smartphone may then extract the data exchange information, including the entity identifier and the characteristic (e.g., the transaction identifier and/or the price point), from the digital representation. The smartphone may then generate the authentication token by inserting the data exchange information extracted from the digital representation, as well as the anonymized identifier for the user of the smartphone, into the authentication token, as further discussed above.

At step 914, computing device 202 may authenticate counterparty 904. For example, smartphone 420 or smartphone 406 may perform biometric verification and/or digital authentication credentials verification, as further discussed above, to verify the user of the smartphone. This authentication step can be performed subsequent to step 912, or earlier, even before the digital representation has been generated.

At step 916, computing device 202 may send the authentication token to intermediary 906. For example, smartphone 420 or smartphone 406 may send the generated authentication token to backend computing system 206. Accordingly, backend computing system 206 may thereby receive the authentication token in accordance with step 302 of method 300.

At step 918, intermediary 906 may identify the parties associated with the proposed transaction (party 902 and counterparty 904), authenticate one or both of the parties, and authorize the transaction. For example, backend computing system 206 may identify the smartphone user (counterparty 904) based on the anonymized identifier and the entity (party 902) based on the identifier in the data exchange information. Intermediary 906 may authenticate party 902 and/or counterparty 904 using any one or more of the authentication techniques discussed above in connection with step 305. For example, backend computing system 206 may authenticate the entity (party 902) using the cryptographic protocol certificate, as discussed further above. Once the desired party (or parties) are authenticated, backend computing system 206 may authorize the transaction (e.g., authorize payment) between counterparty 904 and party 902 by directing account service 908 to make the data transfer (e.g., a payment transfer).

At step 920, account service 908 may transfer payment from counterparty 904 to party 902 (or vice versa) and send corresponding confirmation of the transfer to intermediary 906. For example, once authorization from backend computing system 206 has been received, account service 908 may complete the proposed electronic data exchange by transferring payment from the user's account to the entity's account. Account service 908 may optionally transmit confirmation of completion of the electronic data exchange to backend computing system 206.

At step 922, intermediary 906 may optionally send confirmation of completion of the electronic data exchange directly to party 902 and/or counterparty 904, as further discussed above. More generally, intermediary 906 may transmit, in response to completion of the proposed electronic data exchange, a confirmation notification that confirms completion of the proposed electronic data exchange to (i) the user of the computing device 202 (e.g., counterparty 904) and/or (ii) the entity that generated the digital representation of the proposed electronic data exchange (e.g., party 902).

Party 902 and/or counterparty 904 may, in general, digitally sign their communications using a respective private key assigned to them by backend computing system 206 to propose and/or accept electronic data exchanges, as further discussed above. Additionally, or alternatively, one or both parties may send a public key for the respective other party to use to encrypt communications. in general, the use of a public key infrastructure may help ensure the authenticity of messages transmitted by party 902 and/or counterparty 904, even if one or more of these messages are intercepted by an eavesdropper or malicious attacker. In a specific example, in response to receiving a message from one party (e.g., buyer or seller), the counterparty may decrypt the message using the party's public key. The counterparty may then generate an additional message, such as authentication token 122, and digitally sign the additional message using the counterparty's private key.

Figure 10:
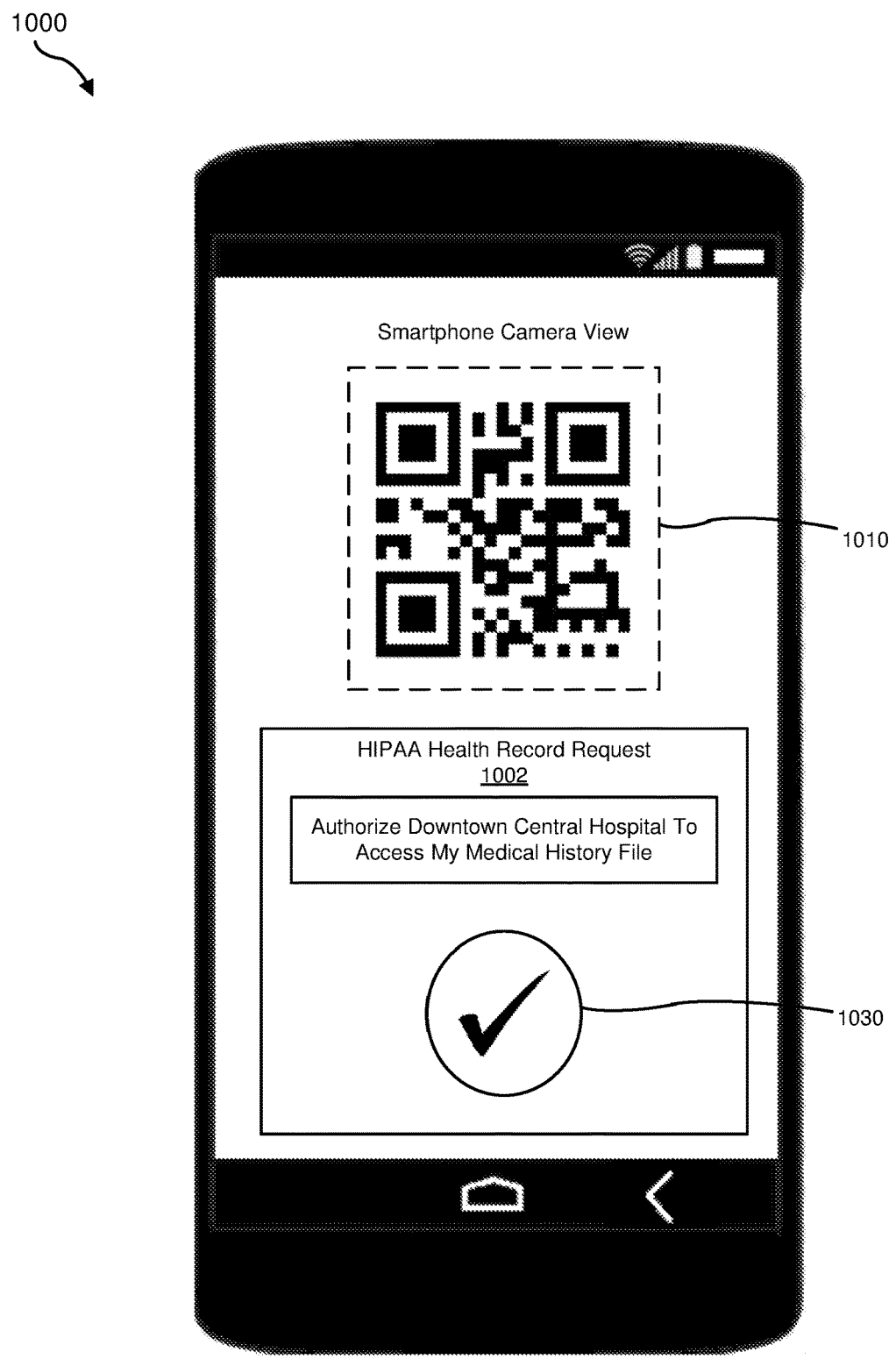
FIG. 10 is a block diagram of a smartphone display implementing the disclosed system according to one embodiment.

FIG. 10 is a block diagram of another example in which the disclosed systems and methods may be used. In this example, a user (e.g., a user of smartphone 1000) may enter a hospital and seek medical assistance. During interactions with hospital staff, the user may decide to release his or her medical records to the hospital. Accordingly, the hospital may generate a digital representation of a proposed electronic data exchange, which in this case may correspond to a QR code that represents a proposed exchange of medical record information. The hospital may generate the digital representation on a point-of-sale device, such as computing device 290 that is discussed above in connection with FIG. 2.

The digital representation may include at least one characteristic of data that is specific to the proposed electronic data exchange. More specifically, the digital representation may specify an identity for the patient corresponding to the medical records. The digital representation may further specify the hospital, doctor, and/or other intended recipients of the medical records. Additionally, the digital representation may optionally specify a transaction number or identifier that designates the proposed electronic data exchange. The digital representation may also optionally specify a distinct set or subset of medical records and thereby include some medical records within the proposed electronic data exchange while excluding other medical records.

In the example of FIG. 10, the user of smartphone 1000 may scan digital representation 1010 using a smartphone camera lens. Smartphone 1000 may optionally display the digital representation that has been obtained, either through a photographic camera or other scanning device, as discussed further above. Upon scanning and/or displaying the digital representation, smartphone 1000 may further display HIPAA health record request 1002, which may further display one or more of the characteristics that are described above and that are encoded within the digital representation. In the specific example of FIG. 10, smartphone 1000 may output a string message to the user stating "Authorize Downtown Central Hospital to Access My Medical History File." That string message may be based on smartphone 1000 extracting an identifier of "Downtown Central Hospital" from digital representation 1010.

Smartphone 1000 may also display a user interface option for accepting the proposal to transfer or release medical records. In the example of FIG. 10, smartphone 1000 may further display a checkmark button 1030. Accordingly, by selecting or toggling checkmark button 1030, the user or patient may thereby accept HIPAA health record request 1002 and furthermore authorize the release of corresponding medical records to the hospital. An authentication token may then be sent to a backend computing system, which may perform the steps shown in FIG. 3 to transfer the data. The disclosed systems and methods may thereby enable a patient to authorize and release medical records without further exposing personally identifiable information to the hospital and the hospital's network computing system.

As detailed above, the disclosed systems and methods may be used to authorize a variety of electronic data exchanges. In a specific example of e-commerce, individuals may use the disclosed systems and methods to perform travel booking online. For example, an individual may use a web browser to browse to a travel booking website, such as TRAVELOCITY. At the travel booking website, the individual may select a specific itinerary in terms of airline travel, hotel reservations, and/or rental car reservations. Upon inputting an indication to purchase the specific itinerary, the travel booking website may generate a corresponding digital representation, as further discussed above. In response, the individual may use the individual's smartphone, or other suitable device, to capture the digital representation, generate the authentication token, transmit the authentication token, and thereby complete and finalize the travel booking. In this embodiment and generally in all other embodiments (unless otherwise specified), the parties may reverse positions within the method of generating the digital representation, capturing the digital representation, generating the authentication token, and transmitting the authentication token (i.e., in alternative embodiments, the customer may generate the digital representation and the e-commerce vendor may generate the authentication token, similar to the embodiment of FIG. 8).

In another example, individuals may use the disclosed systems and methods to pay bills. For example, an individual may view a billing statement either through email or through the bank's secure website. The billing statement may include a specific request for the individual to pay the corresponding bill, perhaps because the bill is either past-due or approaching the due date. Accordingly, the billing statement may further include a digital representation (e.g., a QR code) of the proposed electronic data exchange (i.e., a proposal for the individual to pay the specific bill). In response, the individual may use the individual's smartphone to capture the QR code, generate the authentication token, transmit the authentication token, and thereby complete and finalize the process of paying the bill.

In an additional example, individuals may use the disclosed systems and methods to add funds to prepaid mobile devices. For example, as an individual's prepaid mobile device becomes depleted of corresponding funds, the individual may use another device, such as a laptop, to browse to a website for purchasing additional funds. The website may display a digital representation of the proposed electronic data exchange (e.g., a bank account transaction for purchasing funds for the prepaid mobile device). The individual may then use the prepaid mobile device, which may be equipped with a suitable camera, to capture an image of the digital representation (e.g., a QR code). The individual may then select a button on the prepaid mobile device to authorize the electronic data exchange, which may trigger the prepaid mobile device to generate the authentication token and transmit the authentication token, as discussed further above. Moreover, in this example, the mobile device could alternatively display the digital representation, and the individual could capture the digital representation with another device, such as a secondary smartphone, and then use the secondary smartphone to generate the authentication token and transmit the authentication token, thereby finalizing and completing the corresponding transaction.

In another example, individuals may use the disclosed systems and methods to register for any event or service that otherwise requests personally identifiable information. As discussed above, the disclosed systems and methods may enable the individuals to register for events or services without actually transmitting personally identifiable information. For example, an individual may attempt to register for a symposium or a theater event. As part of the registration process, individual may also select seats, place the requested seats within an e-commerce shopping basket, and then optionally purchase the selected seats. The individual may attempt to perform the registration either online through a web browser or at a local kiosk. In these examples, the web browser or local kiosk may display a digital representation of the proposed electronic data exchange (e.g., event or service registration, seat selection, etc.), and the individual may use the individual's smartphone to capture the digital representation, generate the authentication token, and transmit the authentication token in accordance with method 300, as discussed further above. In this manner, the individual may successfully register for the event or service without transmitting any personally identifiable information (e.g., without exposing the user's name or credit card number, as would be exposed when using conventional event or service registration systems).

In other examples, individuals may use the disclosed systems and methods to log into a device or a program. For example, an individual's smartphone may display a digital representation of a proposed electronic data exchange (e.g., a user account login or authorization). The individual's smartphone may optionally display the digital representation in response to a wake up state-change, which may be triggered by the user pressing a button or touching a touch-screen on the smartphone, after the smartphone has entered a sleep or hibernation state. In response, the individual may use a secondary smartphone, or other suitable device, to capture an image of the displayed digital representation, generate the authentication token, and transmit the authentication token, in accordance with method 300, as discussed further above. Backend computing system 206 may receive the authentication token from the secondary smartphone, complete or finalize the proposed electronic data exchange, and transmit a corresponding notification to the individual's original smartphone. In response to receiving the notification from backend computing system 206, the individual's original smartphone may successfully perform a login to the user's account on the smartphone.

In general, a user may register a variety of different devices with backend computing system 206. The user may thereby enable any one of those devices to display a digital representation that will allow another one of the devices to capture the digital representation, generate the authentication token, transmit the authentication token, and thereby log into the original device that displayed the digital representation.

In other examples, the individual may use the original smartphone, as part of the process for logging into the original smartphone, to capture a picture of a digital representation that is displayed outside of the original smartphone. For example, the individual may use a laptop, or other suitable computing device, to browse to a security vendor website, such as SYMANTEC.COM. The security vendor website may then authenticate the individual using a password, or other security measure, which may be specific to the security vendor website (e.g., a master password that may be kept secret from the original smartphone and, optionally, only used on the security vendor website). Upon authenticating the individual, the security vendor website may display the digital representation and the individual may use the original smartphone to capture an image of the displayed digital representation. The smartphone may then generate the authentication token and transmit the authentication token to backend computing system 206 (which may be managed by the security vendor). Backend computing system 206 may then authenticate the security vendor website and complete and finalize the proposed electronic data exchange by transmitting a notification back to the original smartphone, which may then successfully login the individual. Furthermore, login procedures for accessing email message, network message, instant messaging message, and/or SHORT MESSAGE SERVICE or other text message accounts may function in a parallel manner, in accordance with method 300, as discussed further above.

As further described above, the disclosed systems and methods generally provide an improved technique for authorizing electronic data exchanges, such as digital bank account transactions. The disclosed systems and methods may improve upon related or conventional systems by anonymizing one or both parties from a respective counter-party, while also simplifying and streamlining the corresponding payment ecosystem.

In a concrete embodiment, a computer user may scan a barcode generated by a website and then transmit a corresponding authentication token to a centralized intermediary or broker without entering any personally identifying information. The centralized intermediary may authenticate the website before authorizing the transaction, as further discussed above. In this way, the computer user may complete the transaction without exposing a single item of personally identifiable information. As such, the computer user may find out if the website is not valid (e.g., being spoofed) without entering any personally identifying information.

In another concrete embodiment, a customer at a retail location may simply scan a generated barcode, perform biometric or personal credential authentication, and then transmit a corresponding authentication token to a centralized intermediary or broker, as further discussed above. In this way, the customer may complete the retail transaction without exposing a single item of personally identifiable information. In alternative examples, the customer may generate the barcode and the vendor or sales clerk may scan it, as discussed further above.

Figure 11:
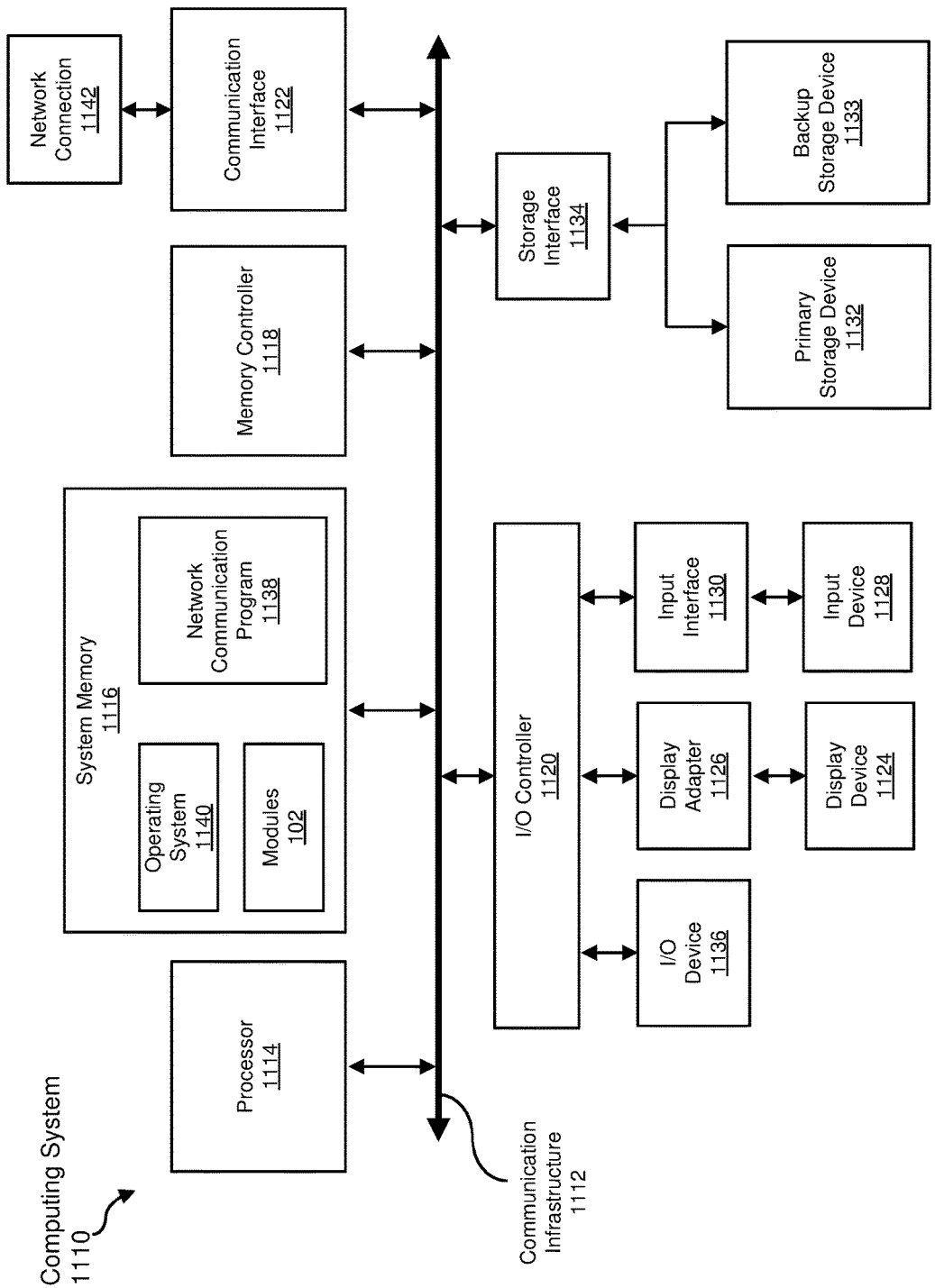
FIG. 11 is a block diagram of an example computing system capable of implementing one or more of the embodiments described and/or illustrated herein.

FIG. 11 is a block diagram of an example computing system 1110 capable of implementing one or more of the embodiments described and/or illustrated herein. For example, all or a portion of computing system 1110 may perform and/or be a means for performing, either alone or in combination with other elements, one or more of the steps described herein (such as one or more of the steps illustrated in FIG. 3). All or a portion of computing system 1110 may also perform and/or be a means for performing any other steps, methods, or processes described and/or illustrated herein.

Computing system 1110 broadly represents any single or multi-processor computing device or system capable of executing computer-readable instructions. Examples of computing system 1110 include, without limitation, workstations, laptops, client-side terminals, servers, distributed computing systems, handheld devices, or any other computing system or device. In its most basic configuration, computing system 1110 may include at least one processor 1114 and a system memory 1116.

Processor 1114 generally represents any type or form of physical processing unit (e.g., a hardware-implemented central processing unit) capable of processing data or interpreting and executing instructions. In certain embodiments, processor 1114 may receive instructions from a software application or module. These instructions may cause processor 1114 to perform the functions of one or more of the example embodiments described and/or illustrated herein.

System memory 1116 generally represents any type or form of volatile or non-volatile storage device or medium capable of storing data and/or other computer-readable instructions. Examples of system memory 1116 include, without limitation, Random Access Memory (RAM), Read Only Memory (ROM), flash memory, or any other suitable memory device. Although not required, in certain embodiments computing system 1110 may include both a volatile memory unit (such as, for example, system memory 1116) and a non-volatile storage device (such as, for example, primary storage device 1132, as described in detail below). In one example, one or more of modules 102 from FIG. 1 may be loaded into system memory 1116.

In some examples, system memory 1116 may store and/or load an operating system 1140 for execution by processor 1114. In one example, operating system 1140 may include and/or represent software that manages computer hardware and software resources and/or provides common services to computer programs and/or applications on computing system 1110. Examples of operating system 1140 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 1110 may also include one or more components or elements in addition to processor 1114 and system memory 1116. For example, as illustrated in FIG. 11, computing system 1110 may include a memory controller 1118, an Input/Output (I/O) controller 1120, and a communication interface 1122, each of which may be interconnected via a communication infrastructure 1112. Communication infrastructure 1112 generally represents any type or form of infrastructure capable of facilitating communication between one or more components of a computing device. Examples of communication infrastructure 1112 include, without limitation, a communication bus (such as an Industry Standard Architecture (ISA), Peripheral Component Interconnect (PCI), PCI Express (PCIe), or similar bus) and a network.

Memory controller 1118 generally represents any type or form of device capable of handling memory or data or controlling communication between one or more components of computing system 1110. For example, in certain embodiments memory controller 1118 may control communication between processor 1114, system memory 1116, and I/O controller 1120 via communication infrastructure 1112.

I/O controller 1120 generally represents any type or form of module capable of coordinating and/or controlling the input and output functions of a computing device. For example, in certain embodiments I/O controller 1120 may control or facilitate transfer of data between one or more elements of computing system 1110, such as processor 1114, system memory 1116, communication interface 1122, display adapter 1126, input interface 1130, and storage interface 1134.

As illustrated in FIG. 11, computing system 1110 may also include at least one display device 1124 coupled to I/O controller 1120 via a display adapter 1126. Display device 1124 generally represents any type or form of device capable of visually displaying information forwarded by display adapter 1126. Similarly, display adapter 1126 generally represents any type or form of device configured to forward graphics, text, and other data from communication infrastructure 1112 (or from a frame buffer, as known in the art) for display on display device 1124.

As illustrated in FIG. 11, example computing system 1110 may also include at least one input device 1128 coupled to I/O controller 1120 via an input interface 1130. Input device 1128 generally represents any type or form of input device capable of providing input, either computer or human generated, to example computing system 1110. Examples of input device 1128 include, without limitation, a keyboard, a pointing device, a speech recognition device, variations or combinations of one or more of the same, and/or any other input device.

Additionally, or alternatively, example computing system 1110 may include additional I/O devices. For example, example computing system 1110 may include I/O device 1136. In this example, I/O device 1136 may include and/or represent a user interface that facilitates human interaction with computing system 1110. Examples of I/O device 1136 include, without limitation, a computer mouse, a keyboard, a monitor, a printer, a modem, a camera, a scanner, a microphone, a touchscreen device, variations or combinations of one or more of the same, and/or any other I/O device.

Communication interface 1122 broadly represents any type or form of communication device or adapter capable of facilitating communication between example computing system 1110 and one or more additional devices. For example, in certain embodiments communication interface 1122 may facilitate communication between computing system 1110 and a private or public network including additional computing systems. Examples of communication interface 1122 include, without limitation, a wired network interface (such as a network interface card), a wireless network interface (such as a wireless network interface card), a modem, and any other suitable interface. In at least one embodiment, communication interface 1122 may provide a direct connection to a remote server via a direct link to a network, such as the Internet. Communication interface 1122 may also indirectly provide such a connection through, for example, a local area network (such as an Ethernet network), a personal area network, a telephone or cable network, a cellular telephone connection, a satellite data connection, or any other suitable connection.

In certain embodiments, communication interface 1122 may also represent a host adapter configured to facilitate communication between computing system 1110 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 1122 may also allow computing system 1110 to engage in distributed or remote computing. For example, communication interface 1122 may receive instructions from a remote device or send instructions to a remote device for execution.

In some examples, system memory 1116 may store and/or load a network communication program 1138 for execution by processor 1114. In one example, network communication program 1138 may include and/or represent software that enables computing system 1110 to establish a network connection 1142 with another computing system (not illustrated in FIG. 11) and/or communicate with the other computing system by way of communication interface 1122. In this example, network communication program 1138 may direct the flow of outgoing traffic that is sent to the other computing system via network connection 1142. Additionally, or alternatively, network communication program 1138 may direct the processing of incoming traffic that is received from the other computing system via network connection 1142 in connection with processor 1114.

Although not illustrated in this way in FIG. 11, network communication program 1138 may alternatively be stored and/or loaded in communication interface 1122. For example, network communication program 1138 may include and/or represent at least a portion of software and/or firmware that is executed by a processor and/or Application Specific Integrated Circuit (ASIC) incorporated in communication interface 1122.

As illustrated in FIG. 11, example computing system 1110 may also include a primary storage device 1132 and a backup storage device 1133 coupled to communication infrastructure 1112 via a storage interface 1134. Storage devices 1132 and 1133 generally represent any type or form of storage device or medium capable of storing data and/or other computer-readable instructions. For example, storage devices 1132 and 1133 may be a magnetic disk drive (e.g., a so-called hard drive), a solid state drive, a floppy disk drive, a magnetic tape drive, an optical disk drive, a flash drive, or the like. Storage interface 1134 generally represents any type or form of interface or device for transferring data between storage devices 1132 and 1133 and other components of computing system 1110.

In certain embodiments, storage devices 1132 and 1133 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1132 and 1133 may also include other similar structures or devices for allowing computer software, data, or other computer-readable instructions to be loaded into computing system 1110. For example, storage devices 1132 and 1133 may be configured to read and write software, data, or other computer-readable information. Storage devices 1132 and 1133 may also be a part of computing system 1110 or may be a separate device accessed through other interface systems.

Many other devices or subsystems may be connected to computing system 1110. Conversely, all of the components and devices illustrated in FIG. 11 need not be present to practice the embodiments described and/or illustrated herein. The devices and subsystems referenced above may also be interconnected in different ways from that shown in FIG. 11. Computing system 1110 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 1110. All or a portion of the computer program stored on the computer-readable medium may then be stored in system memory 1116 and/or various portions of storage devices 1132 and 1133. When executed by processor 1114, a computer program loaded into computing system 1110 may cause processor 1114 to perform and/or be a means for performing the functions of one or more of the example embodiments described and/or illustrated herein. Additionally, or alternatively, one or more of the example embodiments described and/or illustrated herein may be implemented in firmware and/or hardware. For example, computing system 1110 may be configured as an Application Specific Integrated Circuit (ASIC) adapted to implement one or more of the example embodiments disclosed herein.

Figure 12:
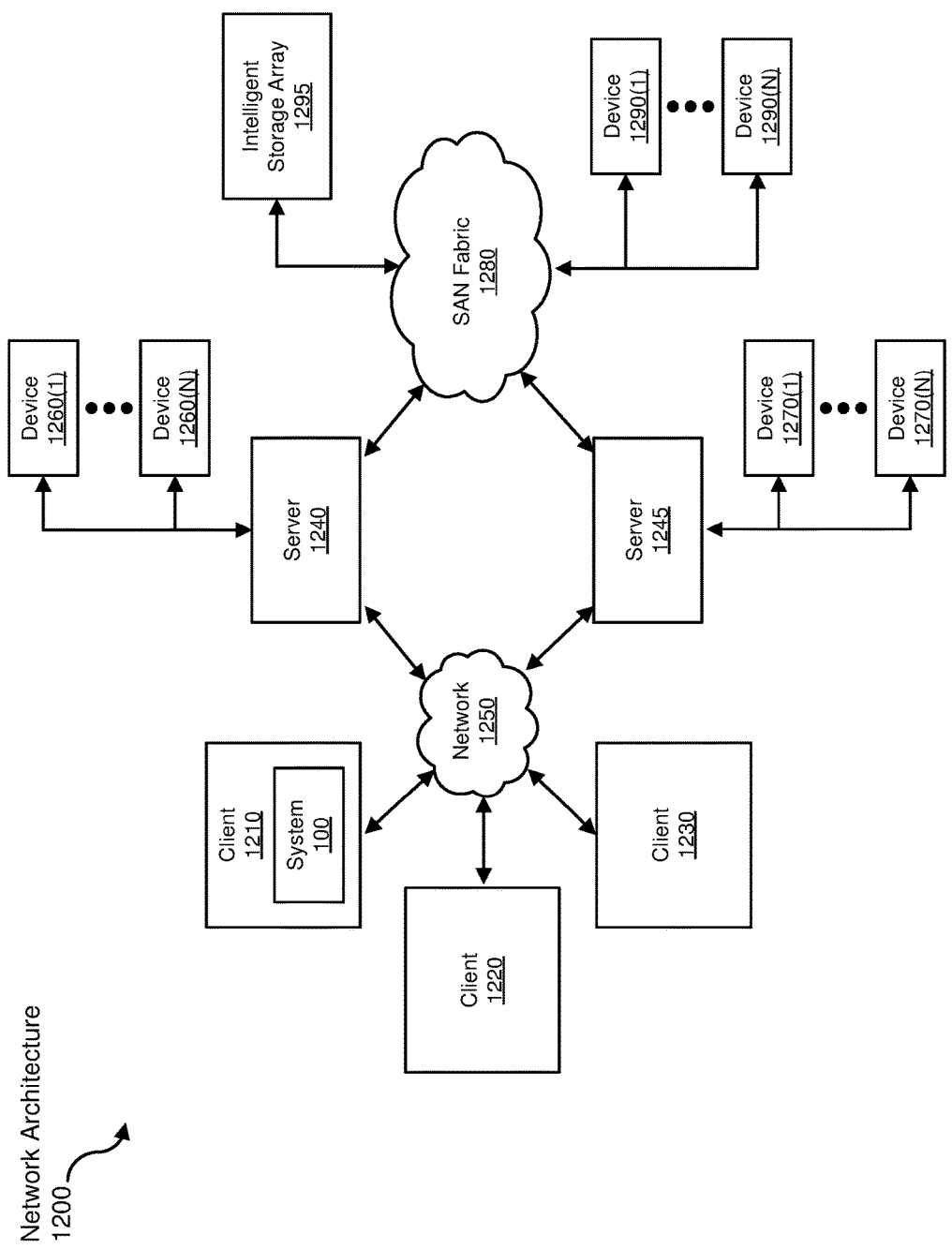
FIG. 12 is a block diagram of an example computing network capable of implementing one or more of the embodiments described and/or illustrated herein.

FIG. 12 is a block diagram of an example network architecture 1200 in which client systems 1210, 1220, and 1230 and servers 1240 and 1245 may be coupled to a network 1250. As detailed above, all or a portion of network architecture 1200 may perform and/or be a means for performing, either alone or in combination with other elements, one or more of the steps disclosed herein (such as one or more of the steps illustrated in FIG. 3 or 6). All or a portion of network architecture 1200 may also be used to perform and/or be a means for performing other steps and features set forth in the instant disclosure.

Client systems 1210, 1220, and 1230 generally represent any type or form of computing device or system, such as example computing system 1110 in FIG. 11. Similarly, servers 1240 and 1245 generally represent computing devices or systems, such as application servers or database servers, configured to provide various database services and/or run certain software applications. Network 1250 generally represents any telecommunication or computer network including, for example, an intranet, a WAN, a LAN, a PAN, or the Internet. In one example, client systems 1210, 1220, and/or 1230 and/or servers 1240 and/or 1245 may include all or a portion of system 100 from FIG. 1.

As illustrated in FIG. 12, one or more storage devices 1260(1)-(N) may be directly attached to server 1240. Similarly, one or more storage devices 1270(1)-(N) may be directly attached to server 1245. Storage devices 1260(1)-(N) and storage devices 1270(1)-(N) generally represent any type or form of storage device or medium capable of storing data and/or other computer-readable instructions. In certain embodiments, storage devices 1260(1)-(N) and storage devices 1270(1)-(N) may represent Network-Attached Storage (NAS) devices configured to communicate with servers 1240 and 1245 using various protocols, such as Network File System (NFS), Server Message Block (SMB), or Common Internet File System (CIFS).

Servers 1240 and 1245 may also be connected to a Storage Area Network (SAN) fabric 1280. SAN fabric 1280 generally represents any type or form of computer network or architecture capable of facilitating communication between a plurality of storage devices. SAN fabric 1280 may facilitate communication between servers 1240 and 1245 and a plurality of storage devices 1290(1)-(N) and/or an intelligent storage array 1295. SAN fabric 1280 may also facilitate, via network 1250 and servers 1240 and 1245, communication between client systems 1210, 1220, and 1230 and storage devices 1290(1)-(N) and/or intelligent storage array 1295 in such a manner that devices 1290(1)-(N) and array 1295 appear as locally attached devices to client systems 1210, 1220, and 1230. As with storage devices 1260(1)-(N) and storage devices 1270(1)-(N), storage devices 1290(1)-(N) and intelligent storage array 1295 generally represent any type or form of storage device or medium capable of storing data and/or other computer-readable instructions.

In certain embodiments, and with reference to example computing system 1110 of FIG. 11, a communication interface, such as communication interface 1122 in FIG. 11, may be used to provide connectivity between each client system 1210, 1220, and 1230 and network 1250. Client systems 1210, 1220, and 1230 may be able to access information on server 1240 or 1245 using, for example, a web browser or other client software. Such software may allow client systems 1210, 1220, and 1230 to access data hosted by server 1240, server 1245, storage devices 1260(1)-(N), storage devices 1270(1)-(N), storage devices 1290(1)-(N), or intelligent storage array 1295. Although FIG. 12 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 1240, server 1245, storage devices 1260(1)-(N), storage devices 1270(1)-(N), storage devices 1290(1)-(N), intelligent storage array 1295, or any combination thereof. All or a portion of one or more of the example embodiments disclosed herein may also be encoded as a computer program, stored in server 1240, run by server 1245, and distributed to client systems 1210, 1220, and 1230 over network 1250.

As detailed above, computing system 1110 and/or one or more components of network architecture 1200 may perform and/or be a means for performing, either alone or in combination with other elements, one or more steps of an example method for protecting personally identifiable information during electronic data exchanges.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally, or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive a digital representation of a proposed electronic data exchange, transform the digital representation by extracting a characteristic and/or using the digital representation (e.g., transforming the digital representation) into an authentication token, output a result of the transformation to a broker computing device, use the result of the transformation to enable streamlined and anonymized electronic data exchanges, and store the result of the transformation to disk or memory. Additionally, or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for protecting personally identifiable information during electronic data exchanges, the method being performed by a first computing device comprising at least one processor, the method comprising:
    receiving, from a computing device, an authentication token for a proposed electronic data exchange, wherein the authentication token comprises:
        an anonymized identifier, for a user of the computing device, that obviates a need to transmit personally identifiable information of the user as part of the proposed electronic data exchange; and
        information of the proposed electronic data exchange extracted by the computing device from an image of a digital representation of the proposed electronic data exchange, wherein extracting data exchange information from the image of the digital representation includes analyzing pixels of the image to identify an electronic code that includes the data exchange information;
    preventing the user's personally identifiable information from entering the proposed electronic data exchange by identifying the user using the anonymized identifier rather than using the user's personally identifiable information;
    authenticating the user identified in the data exchange information; and
    in response to authenticating the user, authorizing completion of the proposed electronic data exchange.

2. The computer-implemented method of claim 1, wherein an entity that generated the digital representation of the proposed electronic data exchange does not receive any of the user's personally identifiable information as part of the proposed electronic data exchange.

3. The computer-implemented method of claim 1, wherein the information of the proposed electronic data exchange extracted by the computing device from the digital representation comprises at least one of:
    an identifier of an entity that generated the digital representation of the proposed electronic data exchange;
    an identifier of a product associated with the proposed electronic data exchange; and
    an identifier of the proposed electronic data exchange.

4. The computer-implemented method of claim 3, further comprising, prior to authorizing completion of the proposed electronic data exchange, using the identifier of the entity that generated the digital representation of the proposed electronic data exchange to authenticate the entity.

5. The computer-implemented method of claim 1, further comprising:
receiving a cryptographic protocol certificate for an entity that is proposing the electronic data exchange; and
authenticating the cryptographic protocol certificate.

6. The computer-implemented method of claim 1, wherein the computing device extracted the digital representation of the proposed electronic data exchange from at least one of:
a website of an entity that generated the digital representation of the proposed electronic data exchange; and
a physical location of the entity.

7. The computer-implemented method of claim 1, wherein an entity generates the digital representation of the proposed electronic data exchange in response to receiving an indication, from the user, to complete the proposed electronic data exchange.

8. The computer-implemented method of claim 1, wherein the computing device authenticated the user's identity prior to transmitting the authentication token.

9. The computer-implemented method of claim 1, wherein authorizing completion of the proposed electronic data exchange comprises authorizing an account service to complete the proposed electronic data exchange by at least one of:
transmitting account information for the user to the account service; and
transmitting, to the account service, account information for an entity that generated the digital representation of the proposed electronic data exchange.

10. The computer-implemented method of claim 9, wherein the account service uses the account information to complete the proposed electronic data exchange by at least one of:
transferring an amount from an account of the user to an account of the entity; and
transferring an amount from the account of the entity to the account of the user.

11. The computer-implemented method of claim 1, wherein the digital representation of the proposed electronic data exchange is encoded within at least one of:
a barcode; and
a wireless data stream.

12. The computer-implemented method of claim 1, further comprising transmitting, in response to completion of the proposed electronic data exchange, a confirmation notification that confirms completion of the proposed electronic data exchange to at least one of:
the user of the computing device; and
an entity that generated the digital representation of the proposed electronic data exchange.

13. The computer-implemented method of claim 1, wherein:
the computing device comprises a smartphone;
the digital representation of the proposed electronic data exchange is encoded within a matrix barcode; and
the smartphone extracts the digital representation of the proposed electronic data exchange at least in part by scanning the matrix barcode, using a digital camera of the smartphone, from at least one of a website and a point-of-sale machine.

14. A system for protecting personally identifiable information during electronic data exchanges, the system comprising:
a reception module, stored in memory, that receives, from a computing device, an authentication token for a proposed electronic data exchange, wherein the authentication token comprises:
an anonymized identifier, for a user of the computing device, that obviates a need to transmit personally identifiable information of the user as part of the proposed electronic data exchange; and
information of the proposed electronic data exchange extracted by the computing device from an image of a digital representation of the proposed electronic data exchange, wherein extracting data exchange information from the image of the digital representation includes analyzing pixels of the image to identify an electronic code that includes the data exchange information;
a prevention module, stored in memory, that prevents the user's personally identifiable information from entering the proposed electronic data exchange by identifying the user using the anonymized identifier rather than using the user's personally identifiable information;
an authentication module, stored in memory, that authenticates the user identified in the anonymized identifier;
an authorization module, stored in memory, that, in response to authenticating the user, authorizes completion of the proposed electronic data exchange; and
at least one physical processor configured to execute the reception module, the prevention module, the authentication module, and the authorization module.

15. The system of claim 14, wherein the system is configured such that an entity that generated the digital representation of the proposed electronic data exchange does not receive any of the user's personally identifiable information as part of the proposed electronic data exchange.

16. The system of claim 14, wherein the information of the proposed electronic data exchange extracted by the computing device from the digital representation comprises at least one of:
an identifier of an entity that generated the digital representation of the proposed electronic data exchange;
an identifier of a product associated with the proposed electronic data exchange; and
an identifier of the proposed electronic data exchange.

17. The system of claim 16, wherein the authentication module, prior to authorizing completion of the proposed electronic data exchange, uses the identifier of the entity that generated the digital representation of the proposed electronic data exchange to authenticate the entity.

18. The system of claim 14, wherein the authentication module further:
receives a cryptographic protocol certificate for an entity that is proposing the electronic data exchange; and
authenticates the cryptographic protocol certificate.

19. The system of claim 14, wherein the computing device extracted the digital representation of the proposed electronic data exchange from at least one of:
a website of an entity that generated the digital representation of the proposed electronic data exchange; and
a physical location of the entity.

20. A non-transitory computer-readable medium comprising one or more computer-readable instructions that, when executed by at least one processor of a backend computing device, cause the backend computing device to:

receive, from a computing device, an authentication token for a proposed electronic data exchange, wherein the authentication token comprises:
   an anonymized identifier, for a user of the computing device, that obviates a need to transmit personally identifiable information of the user as part of the proposed electronic data exchange; and
   information of the proposed electronic data exchange extracted by the computing device from an image of a digital representation of the proposed electronic data exchange, wherein extracting data exchange information from the image of the digital representation includes analyzing pixels of the image to identify an electronic code that includes the data exchange information;
prevent the user's personally identifiable information from entering the proposed electronic data exchange by identifying the user using the anonymized identifier rather than using the user's personally identifiable information;
authenticate the user identified in the data exchange information; and
in response to authenticating the user, authorize completion of the proposed electronic data exchange.

21. A computer-implemented method for protecting personally identifiable information during electronic data exchanges, at least a portion of the method being performed by a computing device comprising at least one processor, the method comprising:
   obtaining, by a first computing device from a second computing device, an image of a digital representation of a proposed electronic data exchange;
   extracting, by the first computing device, information from the image of the digital representation, the information including a characteristic of the proposed electronic data exchange and an identifier of an entity associated with the characteristic, wherein extracting data exchange information from the image of the digital representation includes analyzing pixels of the image to identify an electronic code that includes the data exchange information;
   generating, by the first computing device, an authentication token, the authentication token comprising:
      an anonymized identifier, for a user of the first computing device; and
      the information of the proposed electronic data exchange extracted from the digital representation; and
   electronically transmitting, by the first computing device to a third computing device, the authentication token, for authorization of the proposed electronic data exchange, wherein personally identifiable information of the user is prevented from being transmitted by the first computing device.

22. A computer-implemented method for protecting personally identifiable information during electronic data exchanges, at least a portion of the method being performed by a backend computing system comprising at least one processor, the method comprising:
   receiving, from a computing device, an authentication token for a proposed electronic data exchange, wherein the authentication token comprises:
      an anonymized identifier, for a user of the computing device, that obviates a need to transmit personally identifiable information of the user as part of the proposed electronic data exchange; and
      at least one characteristic of the proposed electronic data exchange extracted by the computing device from an image of a digital representation of the proposed electronic data exchange, wherein extracting data exchange information from the image of the digital representation includes analyzing pixels of the image to identify an electronic code that includes the data exchange information;
   preventing the user's personally identifiable information from entering the proposed electronic data exchange by identifying the user using the anonymized identifier rather than using the user's personally identifiable information;
   authenticating the user identified in the anonymized identifier; and
   in response to authenticating the user, authorizing completion of the proposed electronic data exchange.

23. The computer-implemented method of claim 22, wherein an entity that generated the digital representation of the proposed electronic data exchange does not receive any of the user's personally identifiable information as part of the proposed electronic data exchange.

24. The computer-implemented method of claim 22, wherein the characteristic of the proposed electronic data exchange extracted by the computing device from the digital representation comprises at least one of:
   an identifier of an entity that generated the digital representation of the proposed electronic data exchange;
   an identifier of a product associated with the proposed electronic data exchange; and
   an identifier of the proposed electronic data exchange.

25. The computer-implemented method of claim 24, further comprising, prior to authorizing completion of the proposed electronic data exchange, using the identifier of the entity that generated the digital representation of the proposed electronic data exchange to authenticate the entity.

26. The computer-implemented method of claim 22, further comprising:
   receiving a cryptographic protocol certificate for an entity that is proposing the electronic data exchange; and
   authenticating the cryptographic protocol certificate.

27. The computer-implemented method of claim 22, wherein the computing device extracted the digital representation of the proposed electronic data exchange from at least one of:
   a website of an entity that generated the digital representation of the proposed electronic data exchange; and
   a physical location of the entity.

28. A system for protecting personally identifiable information during electronic data exchanges comprising:
   a first computing device configured to:
      receive, from a second computing device, an image of a digital representation of a proposed electronic data exchange;
      extract information from the image of the digital representation, the information including a characteristic of the proposed electronic data exchange and an identifier of an entity associated with the characteristic, wherein extracting data exchange information from the image of the digital representation includes analyzing pixels of the image to identify an electronic code that includes the data exchange information;
      generate an authentication token, the authentication token comprising:
         an anonymized identifier, for a user of the first computing device; and the information of the proposed electronic data exchange extracted from the digital representation; and electronically transmit, to a third computing device, the authentication token, for authorization of the proposed electronic data exchange between the user and the entity;

the second computing device that is configured to:
  generate the digital representation of the proposed electronic data exchange; and
  output the digital representation of the proposed electronic data exchange for reception by the first computing device; and the third computing device that is configured to:
  receive, from the first computing device, the authentication token, for authorization of the proposed electronic data exchange between the user and the entity; and
  authorize completion of the proposed electronic data exchange;

wherein the system is configured such that personally identifiable information of the user is prevented from being transmitted by the first computing device as part of the electronic data exchange.

* * * * *